(12) United States Patent
Basu Mallick et al.

(10) Patent No.: US 11,356,914 B2
(45) Date of Patent: Jun. 7, 2022

(54) CELL SELECTION AND RESELECTION IN NORMAL AND ENHANCED COVERAGE MODE

(71) Applicant: Panasonic Intellectual Property Corporation of America, Torrance, CA (US)

(72) Inventors: Prateek Basu Mallick, Hessen (DE); Hidetoshi Suzuki, Kanagawa (JP); Joachim Loehr, Hessen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 28 days.

(21) Appl. No.: 16/895,652

(22) Filed: Jun. 8, 2020

(65) Prior Publication Data

US 2020/0305040 A1    Sep. 24, 2020

Related U.S. Application Data

(63) Continuation of application No. 16/670,988, filed on Oct. 31, 2019, now Pat. No. 10,721,662, which is a
(Continued)

(30) Foreign Application Priority Data

Jul. 30, 2014    (EP) .................................... 14179175

(51) Int. Cl.
*H04W 36/04*    (2009.01)
*H04W 48/16*    (2009.01)
(Continued)

(52) U.S. Cl.
CPC .......... *H04W 36/04* (2013.01); *H04B 17/318* (2015.01); *H04L 63/0853* (2013.01); *H04W 48/16* (2013.01); *H04W 74/0833* (2013.01)

(58) Field of Classification Search
CPC ....................................................... H04W 36/04
(Continued)

(56) References Cited

U.S. PATENT DOCUMENTS 9,408,138 B2    8/2016  Wallen et al.
9,838,960 B2    12/2017  Lee
(Continued)

FOREIGN PATENT DOCUMENTS

CN    103916932 A    7/2014
JP    2001-358635 A    12/2001
(Continued)

OTHER PUBLICATIONS

3GPP TSG-RAN WG1 #74b R1-134648, Oct. 2013.
(Continued)

*Primary Examiner* — Chuck Huynh
(74) *Attorney, Agent, or Firm* — Seed IP Law Group LLP

(57) ABSTRACT

The present disclosure relates to methods for selecting or reselecting a cell from among a plurality of cells. The present disclosure is also providing mobile stations for performing these methods, and computer readable media the instructions of which cause the mobile station to perform the methods described herein. For this purpose, the mobile station is detecting cells which are candidates (i.e. candidate cells) for selection or reselection, utilizing either the normal coverage mode or the enhanced coverage mode. Further, the mobile station is selecting or reselecting a cell among the candidate cells detected, utilizing either the normal coverage mode or the enhanced coverage mode. The mobile station is performing the detection and the selection or reselection on the basis of stored information indicating whether or not at least one of the candidate cells supports that the detection and the selection or reselection utilize the enhanced coverage mode.

9 Claims, 13 Drawing Sheets

Related U.S. Application Data continuation of application No. 16/355,440, filed on Mar. 15, 2019, now Pat. No. 10,499,296, which is a continuation of application No. 15/409,965, filed on Jan. 19, 2017, now Pat. No. 10,292,077, which is a continuation of application No. PCT/JP2015/003530, filed on Jul. 13, 2015.

(51) Int. Cl.
    *H04B 17/318*    (2015.01)
    *H04L 9/40*    (2022.01)
    *H04W 74/08*    (2009.01)

(58) Field of Classification Search
    USPC ........................................................ 455/434
    See application file for complete search history.

(56) References Cited

U.S. PATENT DOCUMENTS

| | | | |
|---|---|---|---|
| 10,390,298 | B2 | 8/2019 | Hu et al. |
| 2001/0053191 | A1 | 12/2001 | Tanno et al. |
| 2003/0013480 | A1 | 1/2003 | Endo |
| 2005/0079824 | A1 | 4/2005 | Rick et al. |
| 2009/0247160 | A1 | 10/2009 | Muller |
| 2010/0002611 | A1 | 1/2010 | Umatt et al. |
| 2010/0222060 | A1 | 9/2010 | Zhang et al. |
| 2011/0319076 | A1 | 12/2011 | Ramasamy et al. |
| 2013/0042011 | A1 | 2/2013 | Sugizaki et al. |
| 2013/0121309 | A1 | 5/2013 | Guo et al. |
| 2014/0089761 | A1* | 3/2014 | Kwok .................. G06F 11/1048 714/768 |
| 2014/0098761 | A1* | 4/2014 | Lee ........................ H04W 24/02 370/329 |
| 2014/0185548 | A1 | 7/2014 | Lee |
| 2015/0282052 | A1* | 10/2015 | Wallen .................. H04J 11/0086 455/434 |
| 2017/0013551 | A1* | 1/2017 | Martin .................. H04W 48/20 |

FOREIGN PATENT DOCUMENTS

| | | |
|---|---|---|
| JP | 2003-032166 A | 1/2003 |
| JP | 2007-508747 A | 4/2007 |
| JP | 2008-034906 A | 2/2008 |
| JP | 2010-508717 A | 3/2010 |
| JP | 2013-532437 A | 8/2013 |
| JP | 2015-537422 A | 12/2015 |
| WO | 2007/026679 A1 | 3/2007 |
| WO | 2011/129098 A1 | 10/2011 |
| WO | 2014/169939 A1 | 10/2014 |

OTHER PUBLICATIONS

3GPP TSG-RAN WG2 #85 R2-140825, Feb. 2014.
3GPP TS 36.211 V8.9.0, "Physical Channels and Modulation (Release 8)", Dec. 2009.
3GPP TSG RAN #53 RP-111112, Vodafone: "Provision of low-cost MTC UEs based on LTE", Sep. 2011.
3GPP TSG RAN WG1 #66b R1-112912, Huawei, HiSilicon, CMCC: "Overview on low-cost MTC UEs based on LTE", Oct. 2011.
3GPP TSG RAN #60 RP-130848, Vodafone: "Low cost & enhanced coverage MTC UE for LTE", Jun. 2013.
3GPP TS 36.211, V12.2.0, "Physical channels and modulation (Release 12)", Jun. 2014.
3GPP TS 36.331, V12.2.0, "Radio Resource Control (RRC); Protocol specification (Release 12)", Jun. 2014.
3GPP TS 36.304, V12.2.0, "User Equipment (UE) procedures in idle mode (Release 12)", Sep. 2014.
English Translation of Chinese Search Report dated Dec. 6, 2018 for the related Chinese Patent Application No. 201580019058.3.
International Search Report of PCT application No. PCT/JP2015/003530 dated Sep. 15, 2015.
CATT, "Discussion on mobility support for Low Complexity MTC UEs and MTC coverage enhancement", 3GPP TSG RAN WG2 Meeting #84, San Francisco, USA, Nov. 11-15, 2013, Agenda Item: 7.9.2, Document No. R2-134040, 4 pages.
Huawei et al., "Cell selection and reselection in coverage enhancement", 3GPP TSG RAN WG2 Meeting #85, Prague, Czech Republic, Feb. 10-14, 2014, Agenda Item: 7.9.2, Document No. R2-140327, 3 pages.
Huawei et al., "SIB in 'enchanced coverage mode'", 3GPP TSG-RAN WG2 Meeting #84, San Francisco, US, Nov. 11-15, 2013, Agenda Item: 7.9.2, Document No. R2-133920, 3 pages.
Sony, "Enhanced Coverage Mobility Issues", 3GPP TSG-RAN WG2 Meeting #84, San Francisco, USA, Nov. 11-15, 2013, Agenda Item: 7.9.2, Document No. R2-133821, 4 pages.
3GPP TS 36.304 V9.2.0, "3rd Generation Partnership Project; Technical Specification Group Radio Access Network; Evolved Universal Terrestrial Radio Access (E-UTRA); User Equipment (UE) procedures in idle mode (Release 9)," Mar. 2010, 32 pages.
Alcatel-Lucent, Alcatel-Lucent Shanghai Bell, "Mobility issues of low complexity UE with/without enhanced coverage mode," R2-134330, Agenda item: 7.9.1, 3GPP TSG-RAN WG RAN3#84, San Francisco, USA, Nov. 7-11, 2013, 4 pages.
Alcatel-Lucent Shanghai Bell, Alcatel-Lucent, "Consideration on idle mode MTC UE in enhanced coverage," R2-140729, Agenda item: 7.9.2, 3GPP TSG-WG RAN2#85, Prague, Czech Republic, Feb. 10-14, 2014, 3 pages.
Huawei, HiSilicon, "The introduction of the Idle procedure for eMTC UE," R2-157140, 3GPP TSG-RAN WG2 Meeting #92, Anaheim, USA, Nov. 16-20, 2015, 10 pages.
Samsung, "Cell (re)selection for CE enabled MTC UE," R2-140233, 3GPP TSG-RAN WG2 #85, Prague, Czech Republic, Feb. 10-14, 2014, 2 pages.
Sony, "Enhanced Coverage Issues," R2-140825, Agenda item: 7.9.2, 3GPP TSG-RAN WG2 Meeting #85, Prague, Czech Republic, Feb. 10-14, 2014, 9 pages.

* cited by examiner

CELL SELECTION AND RESELECTION IN NORMAL AND ENHANCED COVERAGE MODE

BACKGROUND

1. Technical Field

The present disclosure relates to methods for selecting or reselecting, by a mobile station, a cell from among a plurality of cells corresponding to at least one radio access terminology, RAT, the mobile station supporting a normal coverage mode and an enhanced coverage mode. The present disclosure is also providing a mobile station and base stations for participating and for performing the methods described herein.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE, each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective $N^{DL}_{RB} * N^{RB}_{SC}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g. 7 OFDM symbols) and $N^{RB}_{SC}$ consecutive subcarriers in the frequency domain as exemplified in FIG. 4 (e.g. 12 subcarriers for a component carrier). In 3GPP LTE (Release 8), a physical resource block thus consists of $N^{DL}_{symb}*N^{RB}_{SC}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For the sake of terminology, in the following the time-frequency resources equivalent to the same $N^{RB}_{SC}$ consecutive subcarriers spanning a full subframe are called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure also apply to later releases.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck in the development of wireless networks, and as a result, it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanisms (e.g. barring) may be used to avoid Rel-8/9 user equipments to camp on a component carrier.

A user equipment may simultaneously receive or transmit one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station), and of possibly different bandwidths in the uplink and the downlink. The number of downlink component carriers that can be configured depends on the downlink aggregation capability of the UE (mobile station). Conversely, the number of uplink component carriers that can be configured depends on the uplink aggregation capability of the UE. It may not be possible to configure a mobile station with more uplink component carriers than downlink component carriers.

In a typical TDD deployment, the number of component carriers and the bandwidth of each component carrier in uplink and downlink is the same. Component carriers originating from the same eNodeB need not provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time, to preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink, there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile station only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

- For each SCell the usage of uplink resources by the UE, in addition to the downlink ones is configurable; the number of DL SCCs configured is therefore always larger or equal to the number of UL SCCs, and no SCell can be configured for usage of uplink resources only.
- The uplink PCell is used for transmission of Layer 1 uplink control information.
- The downlink PCell cannot be de-activated, unlike SCells.
- From UE perspective, each uplink resource only belongs to one serving cell.
- The number of serving cells that can be configured depends on the aggregation capability of the UE.
- Re-establishment is triggered when the downlink PCell experiences Rayleigh fading (RLF), not when downlink SCells experience RLF.
- The downlink PCell cell can change with handover (i.e. with security key change and RACH procedure).
- Non-access stratum information is taken from the downlink PCell.
- PCell can only be changed with handover procedure (i.e. with security key change and RACH procedure).
- PCell is used for transmission of PUCCH.

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation, there is one pair of uplink and downlink component carriers that is always active. The downlink component carrier of that pair might be also referred to as 'DL anchor carrier'. The same applies also for the uplink.

When carrier aggregation is configured, a user equipment may be scheduled over multiple component carriers simultaneously, but at most one random access procedure shall be ongoing at any time. Cross-carrier scheduling allows the PDCCH of a component carrier to schedule resources on another component carrier. For this purpose, a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one-to-one. In other words, more than one downlink component carrier can link to the same uplink component carrier. At the same time, a downlink component carrier can only link to one uplink component carrier.

Small Cell Deployment Scenarios

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G systems.

The anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user stations—is a key to improving traffic capacity and extending the achievable user-data rates of a wireless communication system.

In addition to straightforward densification of a macro deployment, network densification can be achieved by the deployment of complementary low-power nodes, respectively, small cells under the coverage of an existing macro-node layer. In such a heterogeneous deployment, the low-power nodes provide very high traffic capacity and very high user throughput locally, for example in indoor and outdoor hotspot locations. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes, respectively, small cells as well as heterogeneous deployments has been possible since the first release of LTE. In this regard, a number of solutions have been specified in recent releases of LTE (i.e., Release-10/11). More specifically, these recent releases introduced additional tools to handle inter-layer interference in heterogeneous deployments. In order to further optimize performance and provide cost/energy-efficient operation, small cells require further enhancements and in many cases, need to interact with or complement existing macro cells.

Such optimizations are to be investigated as part of the further evolution of LTE—Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Machine Type Communication (MTC)

As LTE deployments evolve, operators strive to reduce the cost of overall network maintenance by minimizing the number of RATs. In this respect, Machine-Type Communications (MTC) devices is a market that is likely to continue expanding in the future.

Many MTC devices are targeting low-end (low cost, low data rate) applications that can be handled adequately by GSM/GPRS. Owing to the low cost of these devices and good coverage of GSM/GPRS, there is very little motivation for MTC device suppliers to use modules supporting the LTE radio interface.

As more and more MTC devices are deployed in the field, this naturally increases the reliance on GSM/GPRS networks. This will cost operators not only in terms of maintaining multiple RATs, but also prevent operators reaping the maximum benefit out of their spectrum (given the non-optimal spectrum efficiency of GSM/GPRS).

Given the likely high number of MTC devices, the overall resource they will need for service provision may be correspondingly significant, and inefficiently assigned (for further details on objectives for MTC, see for example 3GPP, RP-111112, Vodafone: "Provision of low-cost MTC UEs based on LTE", section 4, available at http://www.3gpp.org and incorporated herein by reference).

Approaches to lower the cost of LTE presently regard the volume of products as the primary reason. The impact of volume can be seen in two possible ways, depending on how low-cost MTC is developed. Firstly, if low-cost MTC may be very similar to mainline LTE and included in LTE chipsets, MTC has the benefit of the volume of LTE. Secondly, a low-cost MTC based on LTE may have significantly lower cost than mainline LTE. Although it appears not to have the volume benefit of LTE, the volume of MTC devices can be even larger due to a potentially greater number of supported MTC applications and scenarios.

In this respect, the following approaches to lower the cost of LTE, i.e. defining low-cost MTC are discussed and found to have significant UE cost impact (for further details on low-cost MTC devices, see for example 3GPP, R1-112912, Huawei, HiSilicon, CMCC: "Overview on low-cost MTC UEs based on LTE", section 4, available at http://www.3gpp.org and incorporated herein by reference):

Reduction in supported bandwidth for the low-cost LTE: The low cost of 1.4 MHz (6 RB) downlink bandwidth could cover most application scenarios of MTC. However, 3 MHz (15 RB) or 5 MHz (25 RB) could be considered given that the complexity does not increase much. Given that the uplink may have a larger requirement for MTC services, the possibility of reduced transmit power, and small baseband complexity (relative to downlink reception), any reduction in minimum transmission bandwidth in the UE should be carefully justified.

Modified PDCCH related design for the low-cost LTE to simplify the PDCCH blind decoding and give efficient channel access for a large number of MTC devices: A reduction in maximum bandwidth (e.g., 1.4 MHz) decreases PDCCH blind decoding naturally. Protocol simplification including HARQ consideration, MAC, RLC and RRC protocol. Signaling reduction between low duty cycle MTC devices and the base station. Transmission modes down-selection to maintain coverage and balance complexity.

Further considerations on low-cost MTC devices relate to an improved indoor coverage. A number of applications require indoor deployment of Machine Type Communication, MTC, devices, e.g. in an apartment basement, or on indoor equipment that may be close to the ground floor etc. These UEs would experience significantly greater penetration losses on the radio interface than normal LTE devices. This effectively means that indoor coverage should be readily available and reliable: a significant step change improvement on existing coverage.

Additionally, regarding the power consumption of low-cost MTC devices, it is noted that many applications require devices to have up to ten years of battery life. In this respect, presently available Power Save Modes appear not sufficient to achieve the envisaged battery life. In this respect, it is anticipated that further techniques are proposed to significantly cut down the power usage of MTC devices e.g. by optimizing signaling exchanges in the system, in order to realize battery life of up to ten years.

Enhanced Coverage Mode (EC Mode)

For improving indoor coverage for low-cost MTC devices, recent developments have focused on an Enhanced Coverage, EC, mode that is applicable to UEs operating delay tolerant MTC applications. In this respect, emphasis was given to enhancing the LTE coverage for UEs of a specific UE category/type with respect to the according nominal coverage (for further details on the objectives to the EC mode, see for example 3GPP, RP-130848, Vodafone: "Low cost & enhanced coverage MTC UE for LTE", section 4, available at http://www.3gpp.org and incorporated herein by reference).

The main objective to the Enhanced Coverage mode, that may find its first introduction in 3GPP Release 13, is providing a system with the following capabilities:

Enhance coverage by 20 dB compared to legacy GPRS (Non EGPRS). Both interference limited and noise limited scenarios are to be considered.

Provide a relative LTE coverage improvement—corresponding to 15 dB for FDD—for the UE category/type defined above and other UEs operating delay tolerant MTC applications with respect to their respective nominal coverage.

Scale to support the 13-50 billion machine-to-machine, M2M, devices. It is expected that a high proportion of those devices will suffer from adverse coverage conditions (thus requiring up to 20 dB coverage improvement) and may be deployed in dense clusters within a cell.

Reduce power consumption of MTC devices compared with legacy GPRS (non EGPRS) so that they can have up to ten year battery life, even in locations with adverse coverage conditions where the 20 dB extension might be needed.

Notably, coverage enhancements of 15/20 dB for UEs in the Enhanced Coverage mode with respect to their nominal coverage means that the UEs have to be capable of receiving extremely low signal strengths. This applies not only to the initial scanning operation, the cell search and the cell selection operation but also the subsequent communication scheme to be performed by the UE.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement.

An exemplary implementation of these repeated transmissions prescribes that the same data is transmitted across multiple sub-frames. Yet, it will become immediately apparent that these repeated transmissions will use more resource blocks (time-frequency resources) than required for normal coverage UEs. Further, modified transmissions are limited in their effect, for instance, as they do not assist in the cell selection operation to be performed by the UE.

RF Channel Scan

The scanning of Radio Frequency, RF, channels is an operation to be performed by the UE after power on as well as upon predefined triggers resulting in the cell selection process (e.g. initial cell selection). In the scanning operation, the UE wants to identify a subset of RF channels with the strongest frequencies (e.g. carrier frequencies) in a band. The identified strongest frequencies usually correspond to transmissions of a base station for a cell.

For this purpose, the scanning of RF channels is carried out by the UE in various bands depending on the UEs capabilities. In case the UE's capabilities indicate a plurality of radio access technologies, RATs, then the UE may successively scan the bands corresponding to each of the RATs. The UE decides on the order in which the RF channels in the bands corresponding to the RATs are scanned.

The scanning operation of RF channels is not standardized by 3GPP. Nevertheless, it is common understanding that, according to one implementation, the scanning operation subdivides the band to be scanned into smaller portions for an identification of the strongest frequencies in the band.

For example, in the scanning operation, the UE may first subdivide the band into larger sub-bands for which the scanning is performed on the basis of a larger RF reception window. This may be referred to as a Raw Scan of the band. Further, to narrow down the exact frequency, the UE may perform a Fine Scan in one of the resultant sub-bands of Raw Scan where some energy was found. Fine scan is performed in small portions of the Raw Scan band.

Presuming that an UE supports a plurality of RATs with overlapping bands, the scanning operation may start with a certain band, look for supported RAT(s) in the given band and try to identify the strongest frequencies by the application of the above described Raw Scan, and Fine Scan mechanism:

```
1       For Band = 1 to B {
2           For RAT_type = 1 to R {
3               For each BiRj the UE needs to do first a
4               Raw Scan and then (if it found some
5               energy somewhere) Fine Scan around the
6               frequency/band-area(s) where it found
7               some energy.
8           }
9       }
```

Synchronization Signal Detection

The detection of synchronizations signals is an operation to be performed by an UE on the basis of the output of the scanning operation. In particular, the synchronization signals are detected for the scanned RF channels, e.g. the subset of RF channels with the strongest frequencies. The detection of synchronization for an RF channel allows identification with the cell and the synchronization with transmissions via the cell.

In particular, a synchronization signal is a downlink physical signal which corresponds to a set of resource elements used by the physical layer, but does not carry information originating from higher layers. Downlink physical signals include the synchronization signals and reference signals. In this respect, it is further distinguished between two different types of synchronization signals, namely a primary synchronization signal, and a secondary synchronization signal.

Regarding the implementation of Primary Synchronization Signal (PSS): A sequence is transmitted by every LTE cell every 5 ms. It allows the UE to obtain slot synchronization and part of the physical layer cell IDentifier (cell ID). Three different sequences exist with a one-to-one mapping to three different cell IDs within each of 168 groups of cell IDs. The PSS is based on Zadoff-Chu (ZC) sequences.

Regarding the implementation of Secondary Synchronization Signal (SSS): The SSS is used by the UE to detect the LTE frame timing and to obtain the physical layer cell identity group. It is transmitted twice in each 10 ms frame. The SSS sequences are based on maximum length sequences, known as M-sequences. Each SSS sequence is constructed by interleaving, in the frequency-domain, two length-31 Binary Phase Shift Keying (BPSK)-modulated sequences. These two codes are two different cyclic shifts of a single length-31 M-sequence. The cyclic shift indices of the M-sequences are derived from a function of the physical layer cell identity group. The two codes are alternated between the first and second SSS transmissions in each radio frame. This enables the UE to determine the 10 ms radio frame timing from a single observation of an SSS.

For further details on the definition of synchronization signals, see for example 3GPP, TS 36.211 V12.2.0, "3rd Generation Partnership Project; Technical Specification Group Radio Access Network; Evolved Universal Terrestrial Radio Access (E-UTRA); Physical channels and modulation (Release 12)", section 6.11, available at http://www.3gpp.org and incorporated herein by reference.

System Information Reception

The reception of system information is an operation to be performed by an UE on the basis of a scanned RF signal and a detected synchronization signal. In particular, upon the detection of synchronization signals the UE is capable of identifying a cell and of synchronizing with downlink transmissions by the cell. Accordingly, the UE may receive a broadcast channel, BCH, of a cell, and, hence, the corresponding system information. On the basis thereof, the UE can detect whether or not a cell is suitable for selection and/or reselection, i.e. whether the cell is a candidate cell.

System information is divided into the Master Information Block, MIB, and a number of System Information Blocks, SIBs. The MIB includes a limited number of the most essential and most frequently transmitted parameters that are needed to acquire other information from the cell, and is transmitted on BCH. SIBs other than SystemInformationBlockType1 are carried in System Information, SI, messages and mapping of SIBs to SI messages are flexibly configurable by schedulingInfoList included in SystemInformationBlockType1, with restrictions that: each SIB is contained only in a single SI message, and at most once in that message.

Only SIBs having the same scheduling requirement (periodicity) can be mapped to the same SI message; System InformationBlockType2 is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH.

In particular, the Master Information Block is a block of system information which includes a limited number of the most frequently transmitted parameters which are essential for a UE's initial access to the network—namely the downlink system bandwidth, an indicator of the resources allocated to HARQ acknowledgement signalling in the downlink, and the System Frame Number (SFN).

In the System Information Block the System Information (SI) is broadcast wherein SIB1 contains parameters needed to determine if a cell is suitable for cell selection, as well as information about the time domain scheduling of the other SIBs; SIB2 includes common and shared channel information; SIB3-SIB8 include parameters used to control intra-frequency, inter-frequency and inter-Radio Access Technology (RAT) cell reselection.

For further details on the definition of system information, see for example 3GPP, TS 36.331, V12.2.0, "3rd Generation Partnership Project; Technical Specification Group Radio Access Network; Evolved Universal Terrestrial Radio Access (E-UTRA); Radio Resource Control (RRC); Protocol specification (Release 12)", sections 6.2.2.7 and 6.3.1, available at http://www.3gpp.org and incorporated herein by reference.

Cell Selection

The cell selection is a procedure to be performed by an UE on the basis of the received system information. In particular, the system information enables the UE to determine whether or not a cell is suitable for selection and/or reselection. In this respect, for such a candidate cell, the UE may perform the cell selection operation to camp on the cell.

The term "camped" or, more precisely, "camped normally" refers to a state of the UE where it performs the following tasks: a) select and monitor the indicated Paging Channels of the cell according to information sent in system information; b) monitor relevant System Information; c) perform necessary measurements for the cell reselection evaluation procedure; d) execute the cell reselection evaluation process on the following occasions/triggers: d1) UE internal triggers, so as to meet specified performance criteria; and d2) when information on the BCCH used for the cell reselection evaluation procedure has been modified.

Moreover, in addition to the tasks to be performed, by the UE, in the "camped normally" state, in the "camped on Any Cell" state, the UE shall regularly attempt to find a suitable cell trying all frequencies of all RATs that are supported by the UE. If a suitable cell is found, the UE shall move to "camped normally" state; if the UE supports voice services and the current cell does not support emergency call as indicated in System information, the UE should perform cell selection/reselection to an acceptable cell of any supported RAT regardless of priorities provided in system information from current cell, if no suitable cell is found.

Further to the cell selection, it is generally distinguished between two cell selection procedures, namely the initial cell selection procedure and the stored information cell selection procedure.

For the initial cell selection procedure, no prior knowledge is available of which RF channels are E-UTRA carriers. The UE shall scan all RF channels in the E-UTRA bands according to its capabilities to find a suitable cell. On each carrier frequency, the UE need only search for the strongest cell. Once a suitable cell is found, this cell shall be selected.

For the stored information cell selection procedure, stored information is required of carrier frequencies and optionally also information on cell parameters, from previously received measurement control information elements or from previously detected cells. Once the UE has found a suitable cell, the UE shall select it. If no suitable cell is found, the initial cell selection procedure shall be started.

In particular, cell selection is performed by the UE on the basis of a cell selection criterion S. When the cell selection criterion S for a cell among the candidate cells is fulfilled, then the cell selection is to be performed, when the cell selection criterion S is not fulfilled, then cell selection is not to be performed.

Cell selection corresponds to a state transition to the "camped normally" state for that cell. Further details on the states and state transitions and procedures to be performed by an UE in RRC_IDLE are shown in FIG. 7.

The cell selection criterion S is fulfilled when:

$Srxlev > 0$ AND $Squal > 0$ where:

$Srxlev = Q_{rxlevmeas} - (Q_{rxlevmin} + Q_{rxlevminoffset}) - P_{compensation} - Qoffset_{temp}$ $Squal = Q_{qualmeas} - (Q_{qualmin} + Q_{qualminoffset}) - Qoffset_{temp}$ where:

TABLE 1

| | |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm) |

TABLE 1-continued

| | |
|---|---|
| Q$_{qualmin}$ | Minimum required quality level in the cell (dB) |
| Q$_{rxlevminoffset}$ | Offset to the signalled Q$_{rxlevmin}$ taken into account in the Srxlev evaluation as a result of a periodic search for a higher priority PLMN while camped normally in a VPLMN [5] |
| Q$_{qualminoffset}$ | Offset to the signalled Q$_{qualmin}$ taken into account in the Squal evaluation as a result of a periodic search for a higher priority PLMN while camped normally in a VPLMN [5] |
| P$_{compensation}$ | max(P$_{EMAX}$ − P$_{PowerClass}$, 0) (dB) |
| P$_{EMAX}$ | Maximum TX power level an UE may use when transmitting on the uplink in the cell (dBm) defined as P$_{EMAX}$ in [TS 36.101 ] |
| P$_{PowerClass}$ | Maximum RF output power of the UE (dBm) according to the UE power class as defined in [TS 36.1011 |

The signalled values $Q_{rxlevminoffset}$ and $Q_{qualminoffset}$ are only applied when a cell is evaluated for cell selection as a result of a periodic search for a higher priority PLMN while camped normally in a VPLMN [5]. During this periodic search for higher priority PLMN the UE may check the S criteria of a cell using parameter values stored from a different cell of this higher priority PLMN.

For further details on the definition of cell selection and cell reselection procedures, see for example 3GPP, TS 36.304, V12.2.0, "3rd Generation Partnership Project; Technical Specification Group Radio Access Network; Evolved Universal Terrestrial Radio Access (E-UTRA); User Equipment (UE) procedures in idle mode (Release 12)", sections 5.2.3 and 5.2.4, available at http://www.3gpp.org and incorporated herein by reference.

SUMMARY

In one general aspect, the techniques disclosed here feature a method for selecting or reselecting by a mobile station a cell from among a plurality of cells corresponding to at least one radio access technology, RAT. The mobile station supports a normal coverage mode and an enhanced coverage mode. For this purpose, the mobile station is detecting cells which are candidates (i.e. candidate cells) for selection or reselection by the mobile station. The detecting utilizes either the normal coverage mode or the enhanced coverage mode. Further, the mobile station is selecting or reselecting a cell among the candidate cells detected. The selecting or reselecting utilizes either the normal coverage mode or the enhanced coverage mode.

In case the detecting, utilizing the normal coverage mode, is unsuccessful in detecting any candidate cells, or in case the selecting or reselecting, utilizing the normal coverage mode, is unsuccessful in selecting or reselecting a cell among the candidate cells detected utilizing the normal coverage mode, the mobile station is performing the selecting or reselecting utilizing the enhanced coverage mode among the candidate cells also detected utilizing the enhanced coverage mode.

The mobile station is performing the detecting and the selecting or reselecting on the basis of stored information indicating whether or not at least one of the candidate cells supports that the detecting and the selecting or reselecting utilize the enhanced coverage mode.

In another general aspect, the techniques disclosed here feature a mobile station for selecting or reselecting a cell from among a plurality of cells corresponding to at least one radio access technology, RAT. The mobile station supports a normal coverage mode and an enhanced coverage mode. The mobile station includes a detecting unit and a selecting or reselecting unit.

The detecting unit detects cells which are candidates for selection or reselection by utilizing either the normal coverage mode or the enhanced coverage mode. The selecting or reselecting unit selects or reselects a cell among the candidate cells detected by utilizing either the normal coverage mode or the enhanced coverage mode.

In case the detecting unit, utilizing the normal coverage mode, is unsuccessful in detecting any candidate cells, or in case the selecting or reselecting unit, utilizing the normal coverage mode, is unsuccessful in selecting or reselecting a cell among the candidate cells detected utilizing the normal coverage mode, the selecting or reselecting unit performs the selecting or reselecting by utilizing the enhanced coverage mode among the candidate cells detected by the detecting unit utilizing the enhanced coverage mode.

The detecting unit and the selecting or reselecting unit further perform the detecting, and the selecting or reselecting on the basis of stored information indicating whether or not at least one of the candidate cells supports that the detecting unit and the selecting or reselecting unit utilize the enhanced coverage mode.

In a further general aspect, the techniques disclosed here feature a computer readable medium storing instruction that, when executed by a mobile station supporting a normal coverage mode and an enhanced coverage mode, causes the mobile station to select or reselect a cell from among a plurality of cells corresponding to at least one radio access technology, RAT, by performing: detecting, by the mobile station, cells which are candidates for selection or reselection by the mobile station, the detecting utilizing either the normal coverage mode or the enhanced coverage mode; and selecting or reselecting, by the mobile station, a cell among the candidate cells detected by the detecting, the selecting or reselecting utilizing either the normal coverage mode or the enhanced coverage mode.

In case the detecting, utilizing the normal coverage mode, is unsuccessful in detecting any candidate cells, or in case the selecting or reselecting, utilizing the normal coverage mode, is unsuccessful in selecting or reselecting a cell among the candidate cells detected by the detecting utilizing the normal coverage mode, the mobile station is performing the selecting or reselecting utilizing the enhanced coverage mode among the candidate cells detected by the detecting utilizing the enhanced coverage mode.

The detecting and the selecting or reselecting are performed, by the mobile station, on the basis of stored information indicating whether or not at least one of the candidate cells supports that the detecting and the selecting or reselecting utilize the enhanced coverage mode.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the following, several embodiments will be explained in detail. For exemplary purposes only, most of the embodiments are outlined in relation to a radio access scheme according to 3GPP LTE (Release 8/9) and LTE-A (Release 10/11) mobile communication systems, partly discussed in the BACKGROUND section above.

It should be noted that the disclosure may be advantageously used for an example in a mobile communication system such as 3GPP LTE-A (Release 12) communication systems as described in the BACKGROUND section above.

These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the disclosure.

The explanations should not be understood as limiting the disclosure, but as a mere example of the embodiments to better understand the disclosure. A skilled person should be aware that the general principles of the disclosure as laid out in the claims can be applied to different scenarios and in ways that are not explicitly described herein. Correspondingly, the following scenarios assumed for explanatory purposes of the various embodiments shall not limit the disclosure as such.

Exemplary embodiments will be described with reference to FIGS. 8 to 14. In particular, the exemplary embodiments relate to cell selection and reselection procedures which utilize either a normal coverage mode or an enhanced coverage mode. In this respect, the mobile station, carrying out the cell selection and reselection procedures, is assumed to support the normal coverage mode and the enhanced coverage mode. Throughout the figures, the enhanced coverage mode is indicated with a hatched pattern.

Figure 1:
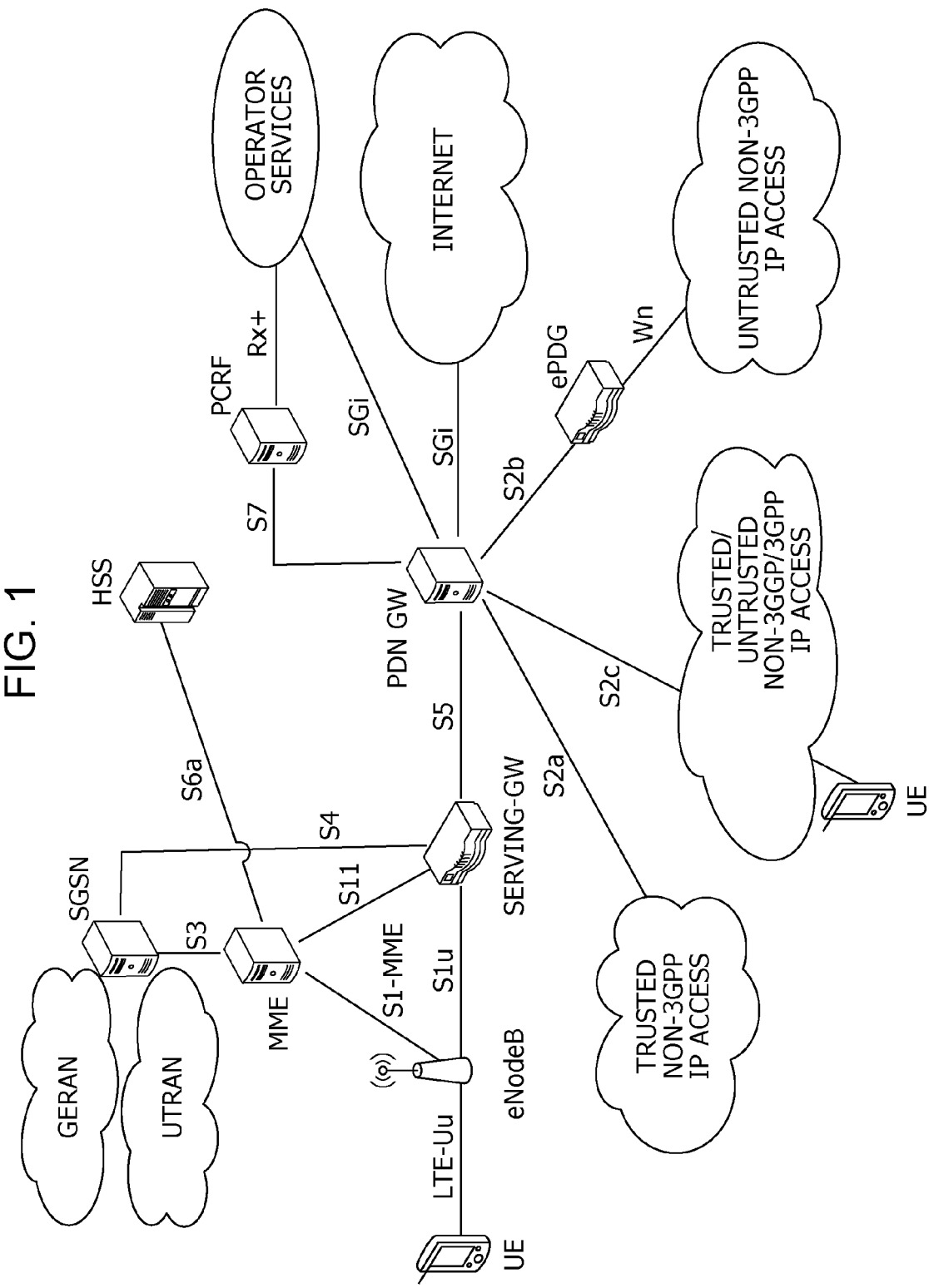
FIG. 1 shows an exemplary architecture of a 3GPP LTE system.
Figure 2:
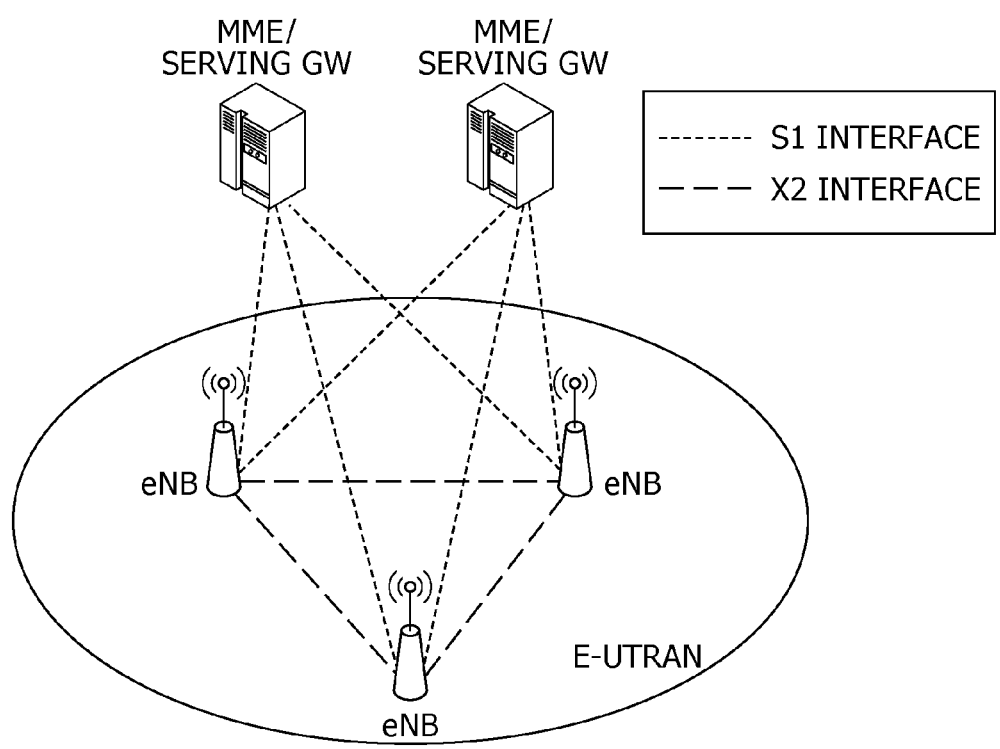
FIG. 2 shows an exemplary overview of the overall E-UTRAN architecture of 3GPP LTE.
Figure 3:
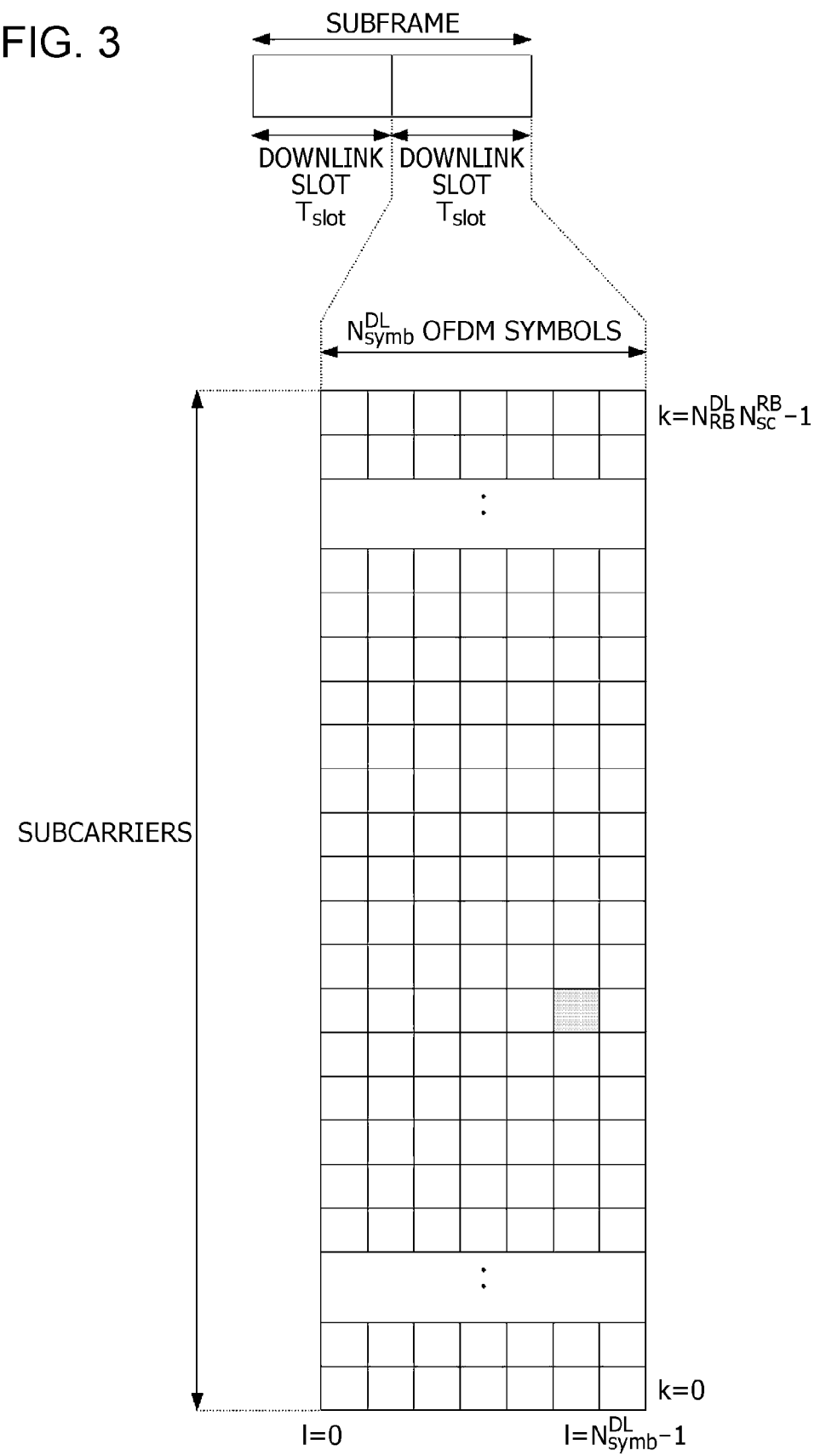
FIG. 3 shows exemplary subframe boundaries on a downlink component carrier as defined for 3GPP LTE (Release 8/9)
Figure 4:
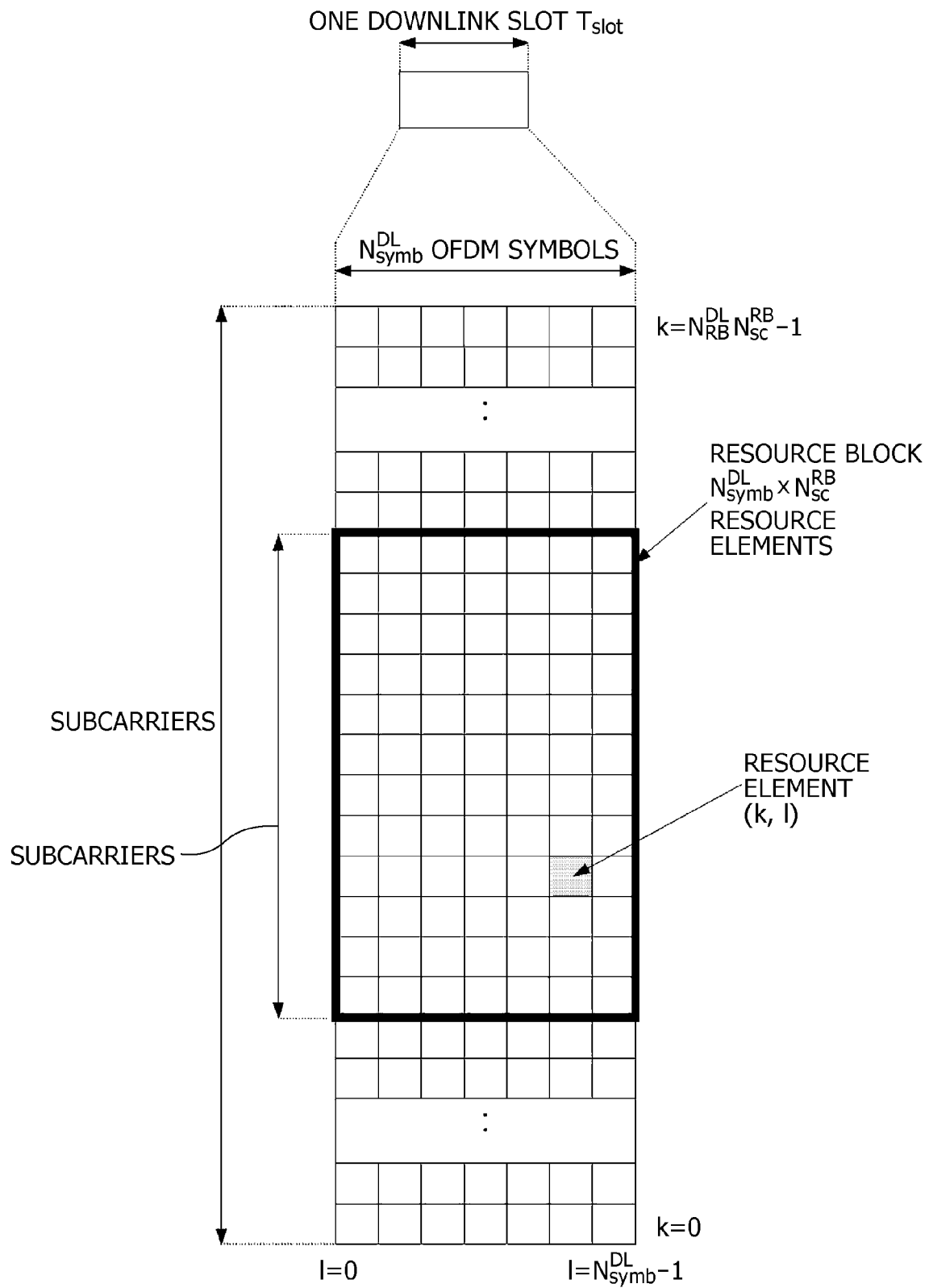
FIG. 4 shows an exemplary downlink resource grid of a downlink slot as defined for 3GPP LTE (Release 8/9)
Figure 5:
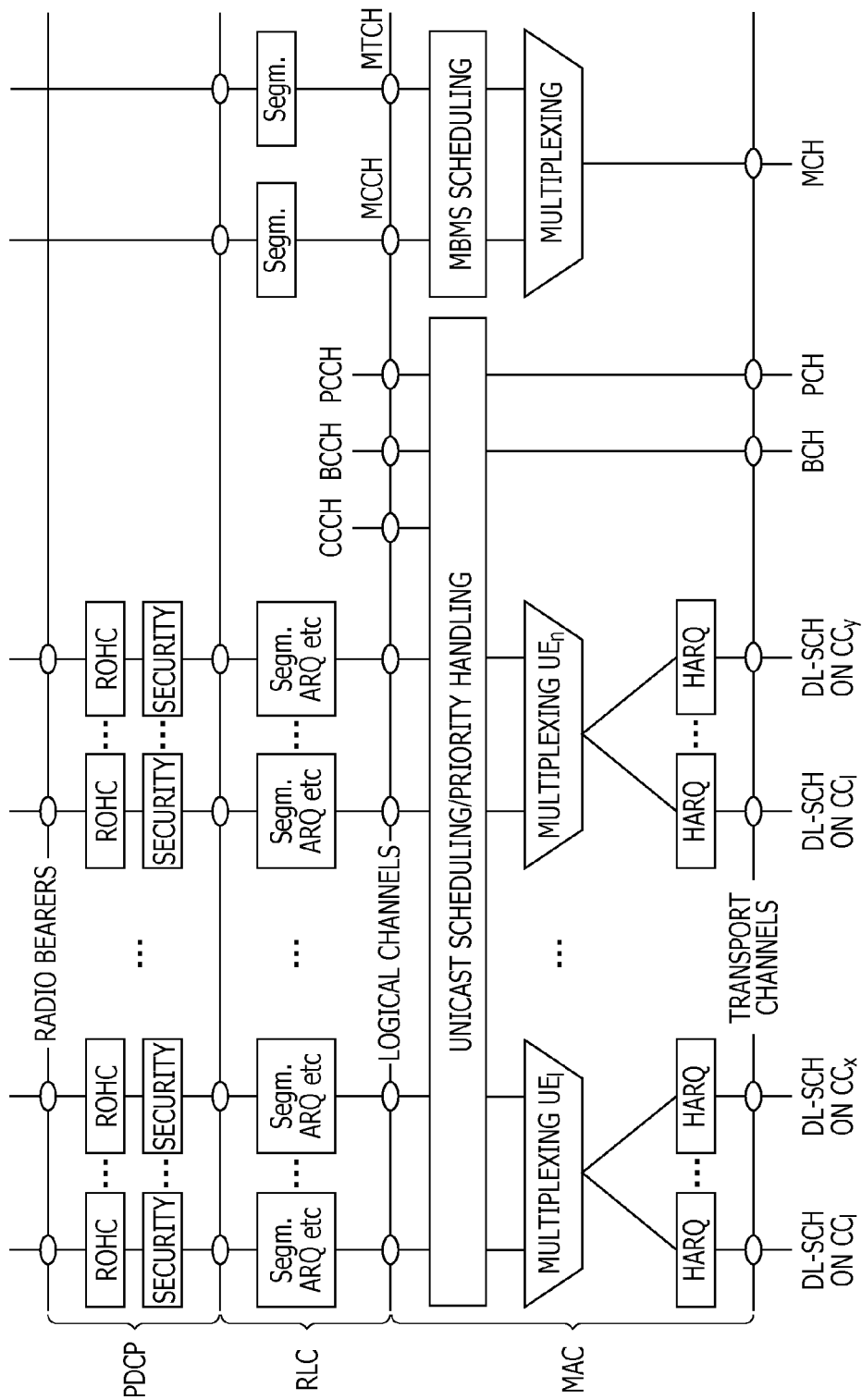
FIG. 5 shows the Layer 2 structure in 3GPP LTE (Release 10) with activated carrier aggregation for the downlink.
Figure 6:
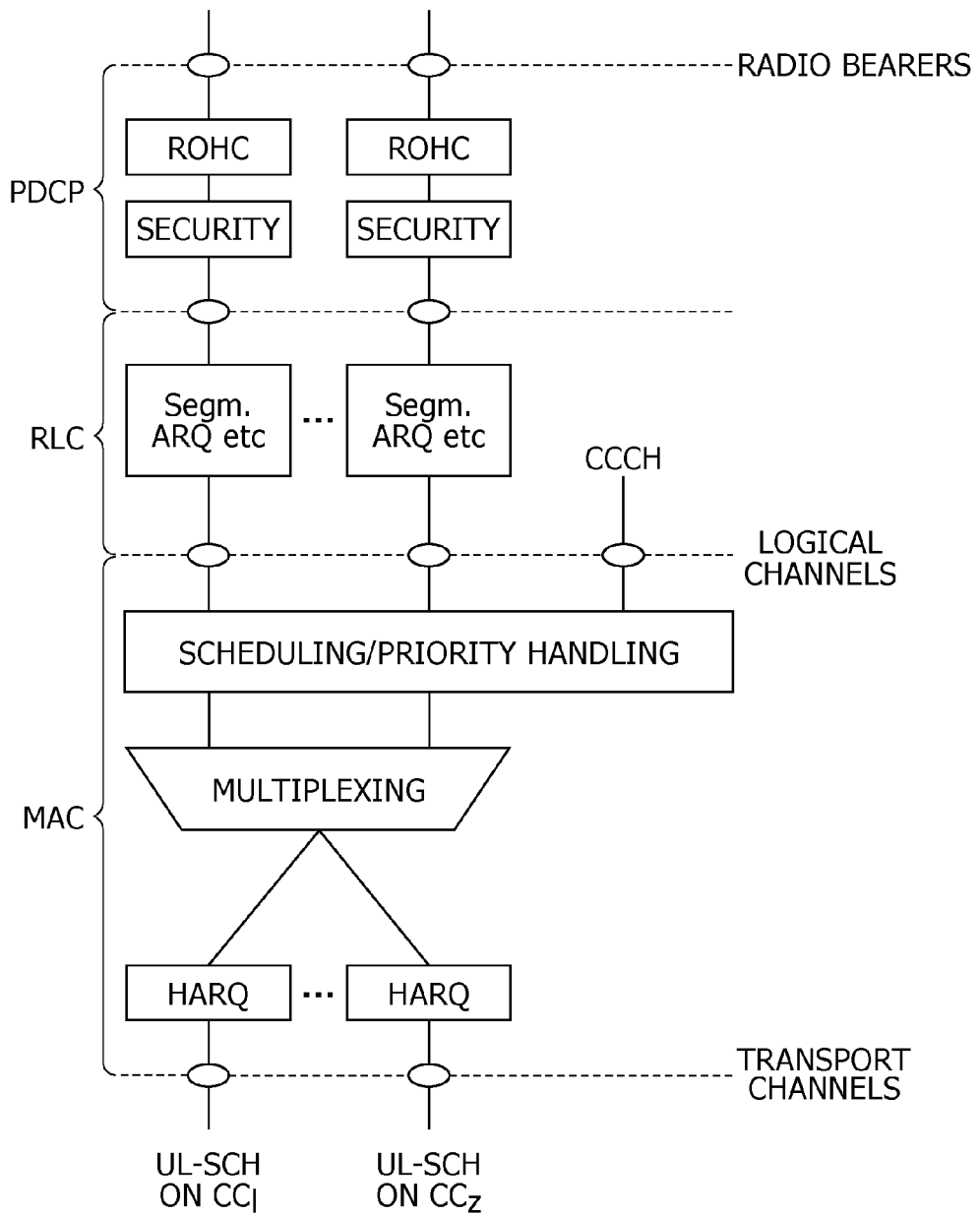
FIG. 6 shows the Layer 2 structure in 3GPP LTE (Release 10) with activated carrier aggregation for the uplink.
Figure 7:
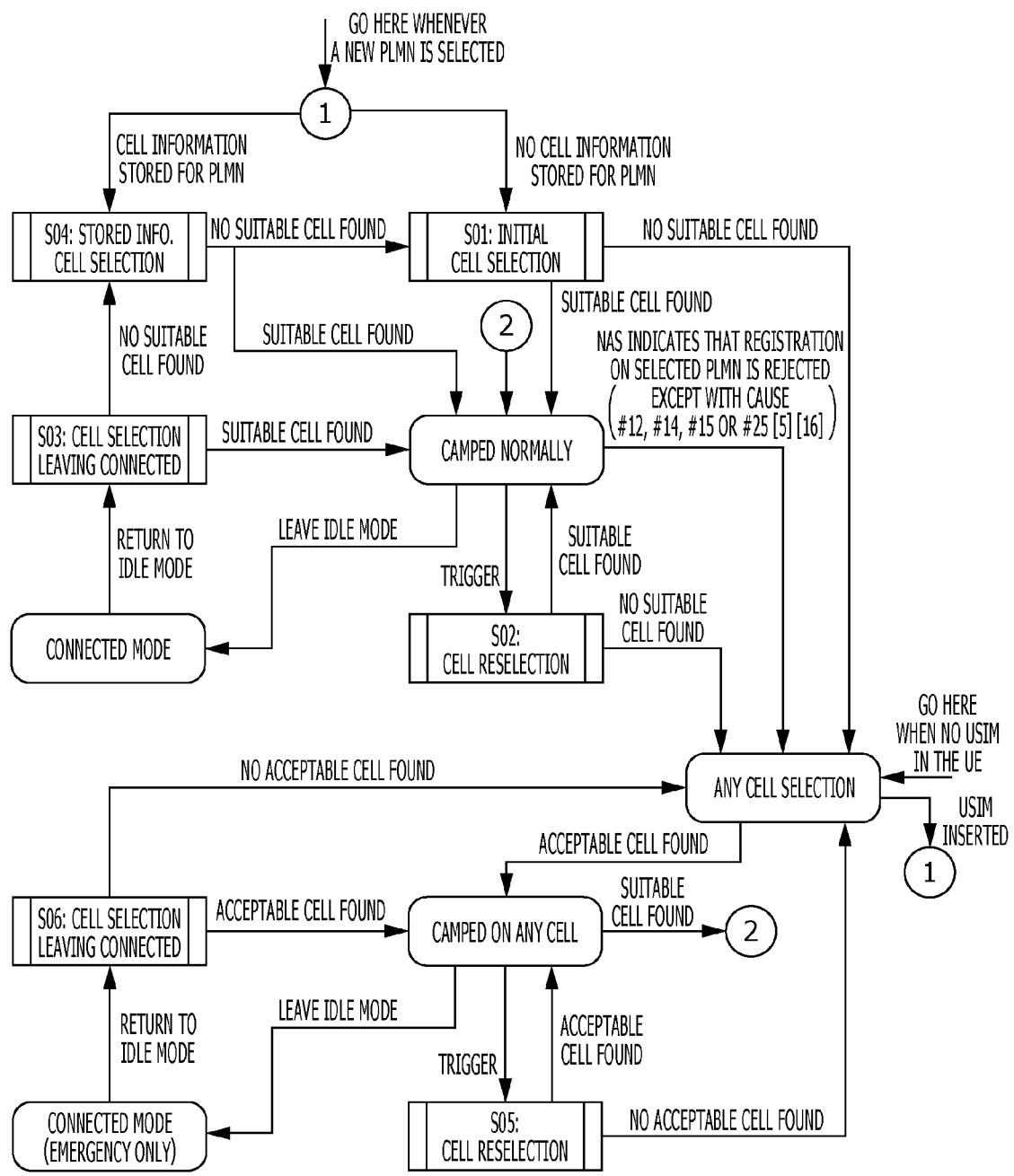
FIG. 7 details the RRC_IDLE cell selection and reselection procedures defined in 3GPP LTE (Release 12)
Figure 8:
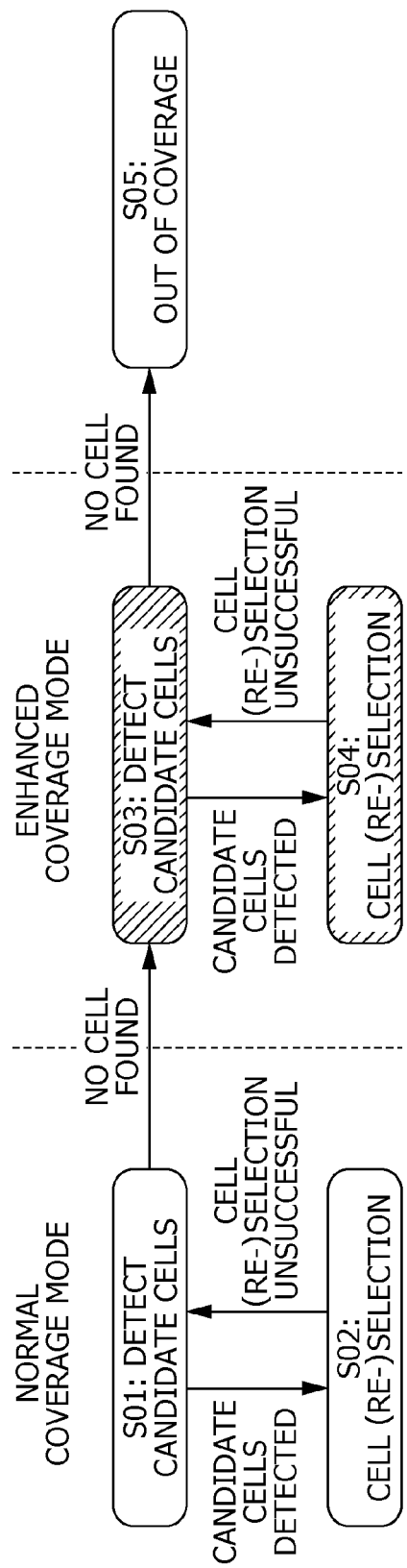
FIG. 8 shows a cell selection and reselection procedure according to an exemplary embodiment.

In other words, should an operation or a procedure of the various embodiments be performed utilizing the enhanced coverage mode, same is illustrated with a respective box including a hatched pattern filling (cf. e.g. FIG. 8, S03). Similarly, a box without filling indicates utilizing the normal coverage mode. Further, boxes with a partially hatched pattern filling (cf. e.g. FIG. 14, S01) indicate that either the normal coverage mode or the enhanced coverage mode is utilized.

In the context of the disclosure, the term "normal coverage mode" refers to the normal mode of operation of a mobile station as specified with respect to the BACKGROUND section. In this respect, the normal coverage mode of a mobile station has to be understood as performing, for example, the detection of candidate cells, and the subsequent cell (re-)selection in accordance with commonly known implementations.

Further, the term "enhanced coverage mode", in the context of the disclosure, refers to a mode of operation of the mobile station which is different from the normal coverage mode. Specifically, in the enhanced coverage mode of operation, the mobile station is configured so as to achieve the objectives defined for the Enhanced Coverage mode in the BACKGROUND section, namely of allowing an enhanced coverage for the mobile station.

In this respect, in the context of the disclosure, the "normal coverage mode" and the "enhanced coverage mode" affect, for example, the configuration of the mobile terminal performing the detection of candidate cells and the cell selection from among the candidate cells. In other words, the detection operation of candidate cells as well as the cell selection or reselection operation from among the selected candidate cells, each utilize the normal coverage mode or the enhanced coverage mode.

However, the above shall not be understood as a limitation to the normal coverage mode or to the enhanced coverage mode. As has been discussed with respect to the BACKGROUND section, the enhanced coverage mode may also affect the downlink transmission by the cell, e.g. repeated downlink transmissions in different sub-frames. In this respect, the enhanced coverage mode must be construed as a mode of operation not only supported by the mobile station but also supported by the base station, for example, when effecting the repeated downlink transmission by the cell.

Figure 9:
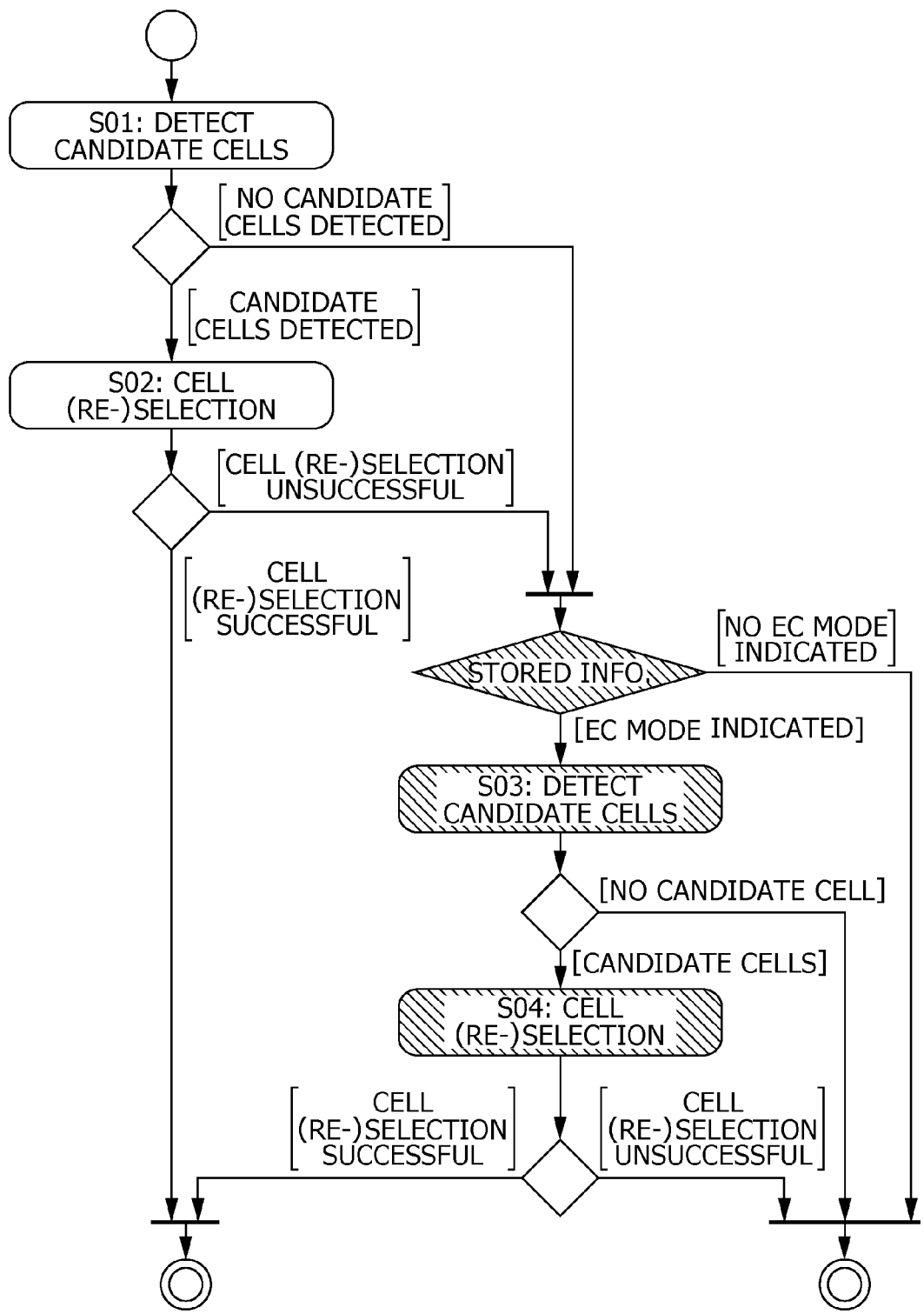
FIG. 9 illustrates a flow diagram of the cell selection and reselection procedure according to the same exemplary embodiment.

Referring now to the embodiment shown in FIGS. 8 and 9, the cell selection or cell reselection to be performed by the mobile station shall be discussed in more detail. In this context, the cell selection or cell reselection is from among a plurality of cells corresponding to at least one radio access technology, RAT, for example, GSM/EDGE Radio Access Network, GERAN, Universal Terrestrial Radio Access Network, UTRAN, Evolved Universal Terrestrial Radio Access Network, E-UTRAN, CDMA2000, WiMAX, and other technologies.

In this embodiment, the mobile station supports the normal coverage mode and the enhanced coverage mode. This means that the cell selection or the cell reselection utilizes either the normal coverage mode or the enhanced coverage mode of operation. In other words, the mobile station is configured in either the normal coverage mode or in the enhanced coverage mode when performing the cell selecting and reselecting procedure from among the plurality of cells.

The cell selection and the cell reselection are two different procedures to be performed by a mobile station, however, both procedures result in one cell being selected or reselected from among a plurality of cells. Needless to say that for a cell selection, the mobile station performs the operation of selecting a cell whereas for a cell reselection, the mobile station performs the operation of reselecting a cell.

In this respect, the cell selection and the cell reselection are two different operations to be performed by the mobile station in different situations. The cell selection is for mobile stations which are not presently camped on (or accessing) a cell or are moving out from connected mode e.g. as a result of (RRC) Connection Release procedure or an RLF (Radio Link Failure). In contrast, the cell reselection is for mobile stations which are presently camped on (or accessing) a cell. In other words, the cell selection selects one cell from among the cells whereas the cell reselection reselects a potentially different cell from among the cells.

Although the cell selection and the cell reselection are different, the embodiment does not distinguish between the two operations since both utilize the normal coverage mode and the enhanced coverage mode in a same manner.

For selecting or reselecting a cell from among a plurality of candidate cells these candidate cells are detected by the mobile station. Detection of candidate cells (i.e. cell candidates), means detecting from among a plurality of cells those candidate cells which may be subsequently selected or reselected, or, putting it differently, for which the selection or reselection may be successful. In other words, the cells from among a plurality of cells which are not candidate cells have such properties that a subsequent selection or reselection of the cells by the mobile station has no prospect of success.

It is inherent to this definition that for the detection of candidate cells, the mobile station applies predetermined minimum criteria to determine among the plurality of cells only those candidate cells which can be used for a subsequent selection or reselection. Accordingly, the candidate cells that are detected by the mobile station are not necessarily all of the plurality of cells but only the cells which meet the predetermined criteria.

The detection of candidate cells utilizes either the normal coverage mode or the enhanced coverage mode. Accordingly, the detection of candidate cells can result, for a mobile station configured in the enhanced coverage mode, in an enhanced detection of candidate cells with respect to the detection by a mobile station configured in the normal coverage mode.

Then, from among the candidate cells detected, a (i.e. single) cell is selected or reselected by the mobile station. The selection or reselection is performed by the mobile station, for camping on (or accessing) the (i.e. single) cell.

It is inherent to this definition that for selecting a (i.e. single) cell from among candidate cells, the mobile station performs an absolute ranking between the candidate cells because all of the candidate cells could, in theory, be successfully selected or reselected. In this respect, once the mobile station finds itself in a situation that it has to perform a cell selection and reselection procedure, the mobile station selects or reselects the (i.e. single) best, absolutely ranked, cell among the candidate cells detected.

Nevertheless, even though, in principle, candidate cells are detected such that a selection or resection must be successful, the mere fact of having two different, subsequently performed operations of, firstly, the detection and, secondly, the selection or reselection, can result in the latter selection or reselection operation being unsuccessful. For example, if the detection of candidate cells takes a long time, some or all candidate cells may have moved out of coverage upon subsequent selection or reselection Also the selection or reselection of a cell from among the candidate cells utilizes either the normal coverage mode or the enhanced coverage mode. Accordingly, the selection or reselection of a cell can result, for a mobile station configured in the enhanced coverage mode, in the selection of a candidate cell where the cell selection or reselection, in the normal coverage mode, is unsuccessful.

Advantageously, the mobile station configured in the enhanced coverage mode allows the detecting operation and the selecting or reselecting operation to be performed with respect to cells with an unfavorable reference signal receive power, RSRP, value, and/or with an unfavorable reference signal receive quality, RSRQ, value. Moreover, the RSRP value and/or the RSRQ value are, for instance, considered to be unfavorable, if the value(s) is/are below a respective power/quality threshold for the normal coverage mode.

In particular to FIGS. 8 and 9, the mobile station of the embodiment detects (cf. step S01), utilizing the normal coverage mode, candidate cells and thereafter, selects or reselects (cf. step S02), utilizing the normal coverage mode, a cell from among the candidate cells.

Depending on, for instance, the cell coverage for the mobile station either one of the operations of detecting of candidate cells or the selecting or reselecting of a (i.e. single) cell from among the candidate cells may be unsuccessful in the normal coverage mode. In other words, "no cell found" can either be due to an unsuccessful detection or an unsuccessful selection or reselection utilizing the normal coverage mode.

In either of the cases of the mobile station, in the normal coverage mode, being unsuccessful in detecting any cell or being unsuccessful in selecting or reselecting a cell, thereafter, the mobile station detects (cf. step S03) candidate cells utilizing the enhanced coverage mode, and then, selects or reselects (cf. step S04), utilizing the enhanced coverage mode, a (i.e. single) cell among the candidate cells detected utilizing also the enhanced coverage mode.

In this respect, even if the mobile station is unsuccessful in performing the cell selection and reselection procedure in the normal coverage mode, it may be successful performing this procedure in the enhanced coverage mode. Should, however, also the cell selection and reselection procedure in the enhanced coverage mode be unsuccessful, then the mobile station may proceed to an out of coverage state (cf. step S05).

According to an exemplary implementation of the selecting or reselecting operation, the mobile station, when utilizing the enhanced coverage mode, evaluates for each of the candidate cells a corresponding cell selection criterion with a reduced minimum required RX value, $Q_{rxlevmin}$, and/or a reduced minimum required quality level, $Q_{qualmin}$. Thereby, the selection or reselection operation of a cell may be ensured to be successful from among candidate cells which are outside of the normal coverage and are detected utilizing the enhanced coverage mode.

According to an alternative exemplary implementation of the selecting or reselecting operation, the mobile station, when utilizing the enhanced coverage mode, selects a cell among the candidate cells by ranking each of the candidate cells on the basis of the measured cell RX level value and/or the measured cell quality value. Accordingly, in the enhanced coverage mode, the mobile station dispenses with determining a cell selection criterion S, as described with respect to the BACKGROUND section. Instead, the mobile station performs the cell selection or reselection operation by comparing measured values specific to each of the candidate cells detected.

According to this embodiment, the mobile station uses stored information for determining whether or not to perform, utilizing the enhanced coverage mode, the detecting of candidate cells and the subsequent selection or reselection of a cell from among the detected candidate cells.

Specifically, in case the stored information, in the mobile station, indicates that at least one of previously detected candidate cells supports the detection and the subsequent selection or reselection to utilize the enhanced coverage mode, only then does the mobile station perform the detection and the selection or reselection, accordingly, in the enhanced coverage mode.

A cell shall be understood to "support" the mobile station when performing the detection and the selection or reselection utilizing the enhanced coverage mode, if the cell supports the enhanced coverage mode. In this respect, the stored information may equally be termed: stored information indicating whether or not at least one of the candidate cells supports the (i.e. same) enhanced coverage mode of the mobile station.

According to an exemplary implementation of the stored information, same stored information not only includes the indication that a cell, from among the previously detected candidate cells, supports the enhanced coverage mode but also (i.e. additionally) includes for this cell at least one of: a physical cell identifier, PCI, a carrier frequency of an RF channel, a radio access technology, RAT, a band corresponding to the RAT, and a frequency priority for enhanced coverage machine type communication, MTC.

According to an alternative exemplary implementation of the stored information, same stored information includes a list indicating for each of the previously detected candidate cells support of the enhanced coverage mode, and additionally includes for each of the candidate cells, at least one of: a physical cell identifier, PCI, a carrier frequency of an RF channel, a radio access technology, RAT, a band corresponding to the RAT, and a frequency priority for enhanced coverage machine type communication, MTC.

The frequency priority may indicate a priority for each of the candidate cells. This priority between the candidate cells may be used by the cell selection or reselection operation to be performed by the mobile station in either the normal coverage mode or in the enhanced coverage mode. According to one implementation, candidate cells supporting the enhanced coverage mode are provided with a lower frequency priority compared to the candidate cells supporting the normal coverage mode. Thereby it can be ensured that the mobile station gives precedence to the cell selection and reselection procedure utilizing the normal coverage mode compare to utilizing the enhanced coverage mode.

Advantageously, since the enhanced coverage mode is costly in terms of power consumption and spectral efficiency to the mobile station as well as to the cell, by use of the stored information the mobile station can ensure to carry out the respective detection and selection or reselection operations only when at least one of the candidate cells equally supports the enhanced coverage mode. In other words, this stored information, in the mobile station, allows the enhanced coverage mode to be utilized only in those situations where the detection and subsequent selection and reselection operations are to be performed with a reasonable expectation of successful completion of the cell selection and reselection procedure.

Figure 10:
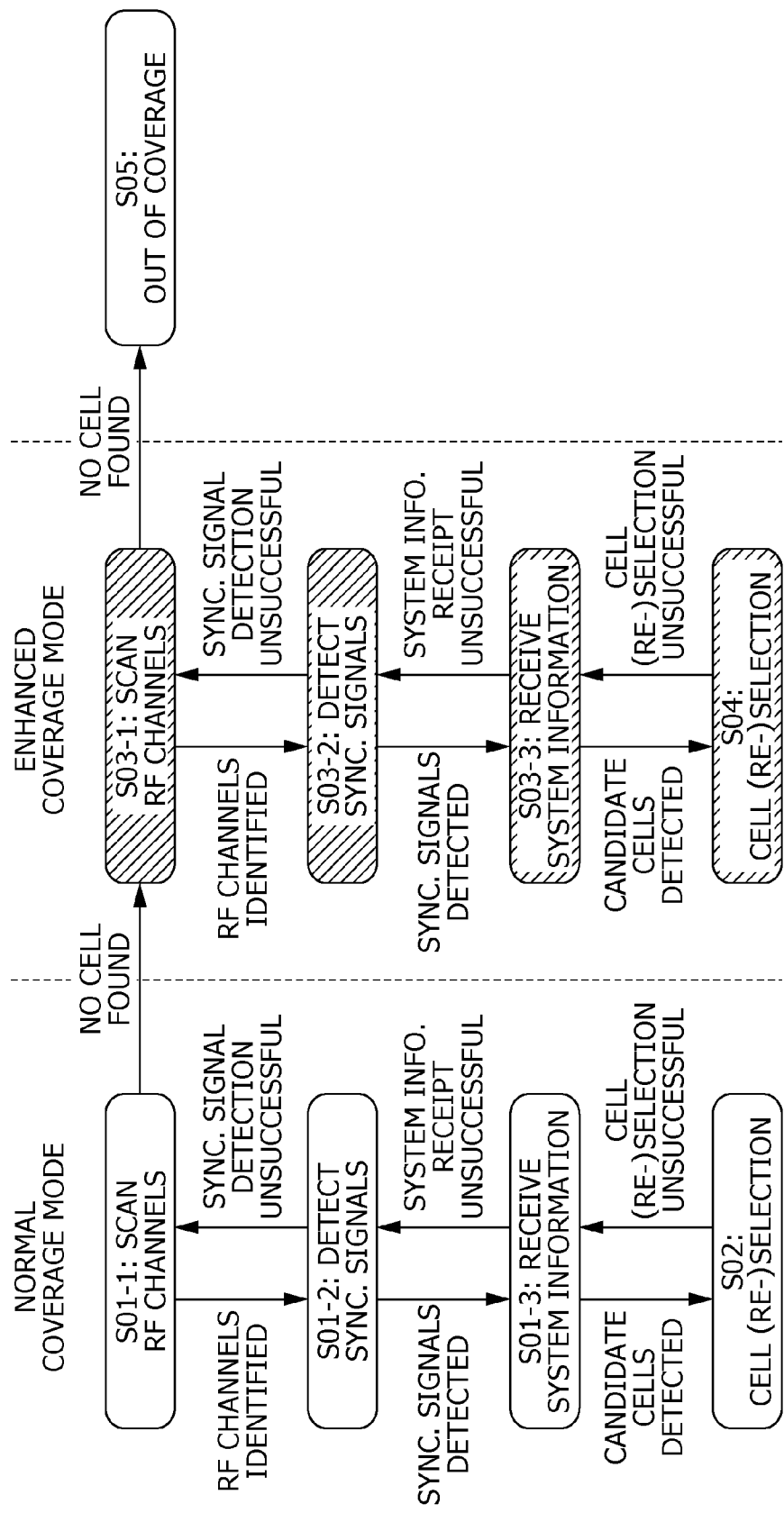
FIG. 10 shows another cell selection and reselection procedure according to a more detailed exemplary embodiment.

A more detailed embodiment of the cell selection and reselection procedure is shown in FIG. 10. Specifically, this more detailed embodiment exemplifies an implementation of the detection operation to be performed for detecting candidate cells for which the mobile station, subsequently, performs the selection or resection operation discussed in connection with the previous embodiment.

According to this more detailed embodiment, a detection, by the mobile station, of candidate cells includes the operations of, firstly, scanning and identifying of RF channels, then, detecting of synchronization signals, and thereafter, receiving system information. Together, these three operations provide candidate cells from among which the mobile station, subsequently, selects or reselects a cell.

However, it shall be emphasized that these three operations to be performed by the mobile station only exemplify an implantation and cannot be construed as limitation to the disclosure.

In this more detailed embodiment, each one of the operations, to be performed by the mobile station, of, firstly, scanning and identifying of RF channels, of, then, detecting synchronization signals and of, thereafter, receiving system information, may utilize either the normal coverage mode or the enhanced coverage mode.

Firstly, the mobile station scans and identifies RF channels (cf. step S01-1, or S03-1) in bands corresponding to the at least one RAT. In this respect, for a band, the mobile station identifies RF channels each corresponding to a cell. In case the mobile station supports multiple RATs, the scanning and identifying RF channels is performed in the bands corresponding to the plurality of RATs, by the mobile station, according to, for instance, the Raw Scan or the Fine Scan operation.

In more detail, to identify, by the mobile station, whether or not an RF channel corresponds to a cell, the mobile station, exemplarily, compares the receive power (e.g. the RSRP) of the RF channel to a power threshold. The power threshold may be predetermined for the mobile station and/or RAT and may differ from power thresholds for other mobile stations and/or RATs. If the receive power of a scanned RF channel is not below the power threshold, then the mobile station identifies the respective RF channel as the cell in respect of which the mobile station, subsequently, performs a detection operation of synchronization signals.

The scanning and identifying of RF channels, by the mobile station, utilizes either the normal coverage mode or the enhanced coverage mode. In the normal coverage mode, the scanning and identifying of RF channels may be unsuccessful compared to in the enhanced coverage mode. In other words, the mobile station in the enhanced coverage mode may better identify, with enhanced coverage, RF channels corresponding to cells.

Exemplarily, the scanning and identifying operation of RF channels utilizing the enhanced coverage mode differs from that utilizing the normal coverage mode by the mobile station performing, when utilizing the enhanced coverage mode, the scanning operation with an improved (i.e. a better) receiver sensitivity. The scanning and identifying operation with an improved receiver sensitivity allows for the mobile station to compensate, for example, a lower signal to noise ratio, SNR.

Advantageously, the mobile station, configured in the enhanced coverage mode, is enabled to detect—among others—cells as cell candidates for which the reference signal receive power, RSRP, value is below a power threshold configured for the normal coverage mode.

Then, the mobile station detects synchronization signals (cf. step S01-2, or S03-2) transmitted over the scanned and identified RF channels. Synchronization signals enable identification of a cell and synchronization with downlink transmissions of the cell. In other words, upon detection of synchronization signals for each of the scanned and identified RF channels, the mobile station is capable of identifying the respective cells and synchronizing therewith.

More particularly, the synchronization of the mobile station with downlink transmissions by a cell allows the mobile station to receive, for example, broadcasted information. This broadcasted information may include system information of the respective cell identifying whether or not the respective cell can be considered a candidate cell for cell selection or reselection. In this respect, the detection of synchronization signals is a further operation included in the detection operation of candidate cells of the previous embodiment.

The detecting of synchronization signals, by the mobile station, utilizes either the normal coverage mode or the enhanced coverage mode. In the normal coverage mode, the detecting of synchronization signals may be unsuccessful compared to in the enhanced coverage mode. In other words, the mobile station in the enhanced coverage mode may better detect, with enhanced coverage, synchronization signals enabling improved identification of cells.

Exemplarily, the detection operation of synchronization signals utilizing the enhanced coverage mode differs from that utilizing the normal coverage mode by the mobile station detecting, when utilizing the enhanced coverage mode, synchronization signals with an extended averaging window. The detection operation with an extended averaging window allows for the mobile station to compensate, for example, a lower signal to noise ratio, SNR.

Advantageously, the mobile station, configured in the enhanced coverage mode, is enabled to detect—among others—cells as cell candidates for which the reference signal receive power, RSRP, value is below a power threshold configured for the normal coverage mode.

Thereafter, the mobile station receives system information (cf. step S01-3, or S03-3) from each of the cells for which synchronization signals are detected. System information enables the mobile station to access the respective cell and to detect whether or not the cell is a candidate cell for the selection or reselection operation. In other words, upon receipt of the system information for each of the cells for which synchronization signals are detected, the mobile station detects candidate cells for subsequent cell selection or reselection.

More particularly, the system information to be received by the mobile station, includes, for example, master information block, MIB, and system information block(s), SIB(s). The system information including both the MIB, and the SIB(s) is discussed with respect to the BACKGROUND section. Advantageously, each cell transmits the system information as broadcasted information, thereby allowing the mobile station to receive same information, namely upon successful detection of the synchronization signals of the cell.

The receiving of system information, by the mobile station, utilizes either the normal coverage mode or the enhanced coverage mode. In the normal coverage mode, the receiving of system information may be unsuccessful compared to in the enhanced coverage mode. In other words, the mobile station in the enhanced coverage mode may better receive, with enhanced coverage, system information enabling improved detection of candidate cells.

Exemplarily, the receiving operation of system information utilizing the enhanced coverage mode differs from that utilizing the normal coverage mode by the mobile station receiving, when utilizing the enhanced coverage mode, repeated transmissions of the same system information, and subsequently combining same. The combination of repeated transmissions of the same system information allows for the mobile station to compensate, for example, a lower signal to noise ratio, SNR. The combining repeated transmissions can be implemented via soft-combining techniques.

Advantageously, the mobile station, configured in the enhanced coverage mode, is enabled to detect—among others—cells as cell candidates for which the reference single receive power, RSRP, value is below a power threshold configured for the normal coverage mode.

Consequently, the operations of, firstly, scanning and identifying of RF channels, then, detecting of synchronization signals, and, thereafter, receiving system information, according to this more detailed embodiment, equally result in the detection, by the mobile station, of candidate cells from among which the mobile station, subsequently, selects or reselects a cell. For the selection or reselection (cf. step S02 or S04) of a cell, reference is made to the respective previous embodiment described in connection with FIGS. 8 and 9.

Nevertheless, it shall be also pointed out for this more detailed embodiment that the mobile station accesses stored information for determining whether or not to perform, utilizing the enhanced coverage mode, the detecting of candidate cells in form of, firstly, scanning and identifying of RF channels, then, detecting of synchronization signals, and, thereafter, receiving system information, and the subsequent selection or reselection of a cell from among the detected candidate cells.

Specifically, in case the stored information, in the mobile station, indicates that at least one of the previously detected candidate cells supports the detection and the subsequent selection or reselection to utilize the enhanced coverage mode, only then does the mobile station perform the detection and the selection or reselection, accordingly, in the enhanced coverage mode.

Advantageously, since the enhanced coverage mode is costly in terms of power consumption and spectral efficiency to the mobile station as well as to the cell, by use of the stored information the mobile station can ensure to carry out the respective detection and selection or reselection operation only when at least one of the candidate cells equally supports the enhanced coverage mode.

First Example of Another More Detailed Embodiment

Figure 11:
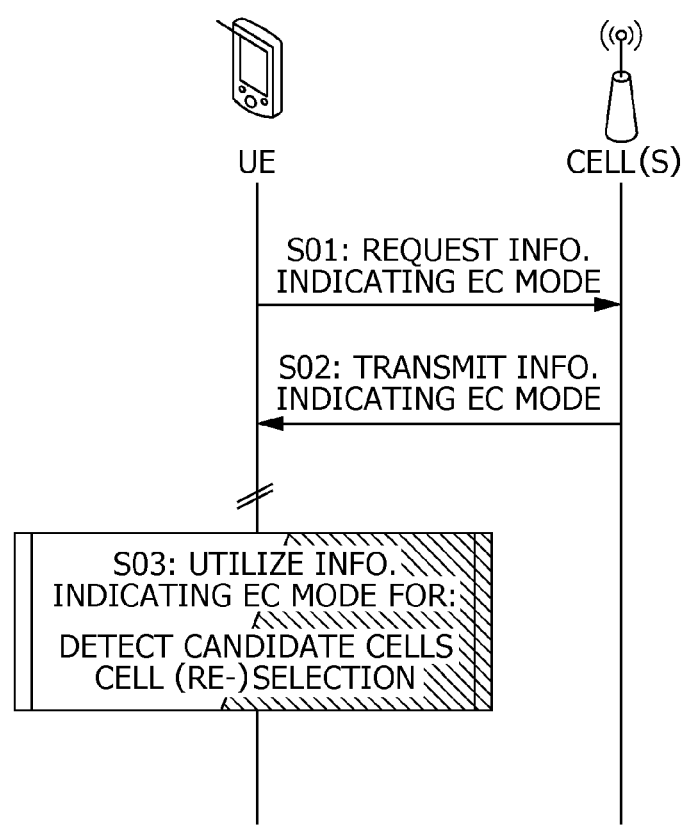
FIG. 11 illustrates a first example of obtaining stored information for the cell selection and reselection procedure.

A first example of another more detailed embodiment of the cell selection and reselection procedure is shown in FIG. 11. Specifically, this more detailed embodiment exemplifies how the stored information is obtained by the mobile station such that it can be used for determining whether or not, at a later point in time, to perform, utilizing the enhanced coverage mode, the detecting of candidate cells, and the subsequent selection or reselection of a cell from among the detected candidate cells.

Further to this example, the mobile station is assumed to be camped on (or accessing) a cell. In this respect, it is, however, insignificant whether or not the mobile station is configured in the normal coverage mode or in the enhanced coverage mode when camped on (or accessing) the cell. Moreover, it is only important that the mobile station is configured for uplink and downlink communication within the cell.

In this context, the mobile station requests (cf. step S01) a selected cell to transmit information indicating whether or not at least one of the candidate cells supports that the detecting operation and the selecting or reselecting operation utilize the enhanced coverage mode. The selected cell from which the mobile station requests the information may be the cell on which the mobile station is camped (or accessing).

In response to the request, the mobile station, subsequently, receives (cf. step S02) the information indicating whether or not at least one of the candidate cells supports that the detecting operation and the selecting or reselecting operation utilize the enhanced coverage mode. The information is transmitted by the selected cell from which the mobile station requests the information, for example, in a dedicated control message.

The mobile station, upon receipt of the information, stores the received information (e.g. by supplementing, updating or replacing the previously stored information) in order to use (cf. step S03) the newly stored information for determining whether or not, at a later point in time, to perform, utilizing the enhanced coverage mode, the detecting operation of candidate cells and the subsequent selection or reselection operation of a cell from among the detected candidate cells.

In an exemplary implementation, the mobile station includes, in the request, the previously detected candidate cells, to receive the information indicating whether or not at least one of these previously detected candidate cells supports the mobile station utilizing the enhanced coverage mode.

In an alternative implementation, the mobile station assumes that the candidate cells at least include cells which are neighbors (i.e. neighboring cells) of the selected cell on which the mobile station is camped. Accordingly, the mobile station dispenses with including any information on previously detected candidate cells in the request. In this respect, the mobile station requests the selected cell to transmit information indicating whether or not at least one of its neighboring cells supports the enhanced coverage mode.

As the neighboring cells to the selected cell form a subset of the candidate cells of the mobile station, the information, indicating whether or not at least one of it and its neighboring cells supports the enhanced coverage mode, equally allows the mobile station to determine whether or not, at a later point in time, to perform, utilizing the enhanced coverage mode, the detecting of candidate cells and the subsequent selection or reselection of a cell from among the detected candidate cells.

Needless to say, the stored information, received by the mobile station, may not only include the indication that a candidate cell supports the enhanced coverage mode but may also (i.e. additionally) include for this candidate cell at least one of: a physical cell identifier, PCI, a carrier frequency of an RF channel, a radio access technology, RAT, a band corresponding to the RAT, and a frequency priority for enhanced coverage machine type communication, MTC.

Second Example of Another More Detailed Embodiment

Figure 12:
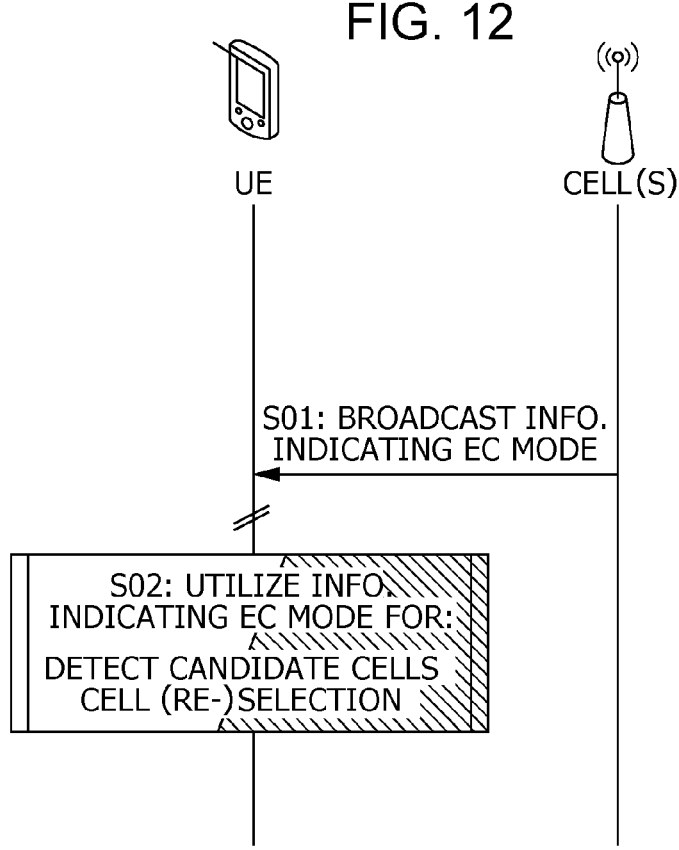
FIG. 12 shows another example of obtaining stored information for the cell selection and reselection procedure.

A second example of another more detailed embodiment of the cell selection and reselection procedure is shown in FIG. 12. Specifically, this more detailed embodiment exemplifies how the stored information is obtained by the mobile station such that it can be used for determining whether or not, at a later point in time, to perform, utilizing the enhanced coverage mode, the detecting of candidate cells, and the subsequent selection or reselection of a cell from among the detected candidate cells.

Further to this example, the mobile station is assumed to be camped on (or accessing) a cell. In this respect, it is, however, insignificant whether or not the mobile station is configured in the normal coverage mode or in the enhanced coverage mode when camped on (or accessing) the cell. Moreover, it is only important that the mobile station is configured for downlink communication (e.g. to receive broadcasted information) within the cell.

In this context, the mobile station receives (cf. step S01) as broadcasted information the information indicating whether or not at least one of the candidate cells supports that the detecting operation and the selecting or reselecting operation utilize the enhanced coverage mode. The information is broadcasted by the selected cell, for example, as being included in system information transmitted by the selected cell.

The mobile station, upon receipt of the information, stores the received information (e.g. by supplementing, updating or replacing the previously stored information) in order to use (cf. step S02) the newly stored information for determining whether or not, at a later point in time, to perform, utilizing the enhanced coverage mode, the detecting operation of candidate cells and the subsequent selection or reselection operation of a cell from among the detected candidate cells.

In an exemplary implementation, the mobile station receives from the selected cell information indicating whether or not at least one of it and its neighboring cells supports the enhanced coverage mode. However, as the neighboring cells to the selected cell form at least a subset of the candidate cells of the mobile station, the information, indicating whether or not at least one of its neighboring cells supports the enhanced coverage mode, equally allows the mobile station to determine whether or not, at a later point in time, to perform, utilizing the enhanced coverage mode, the detecting of candidate cells and the subsequent selection or reselection of a cell from among the detected candidate cells.

Needless to say, also in this example the stored information received by the mobile station, may not only include the indication that a candidate cell supports the enhanced coverage mode but may also (i.e. additionally) include for this candidate cell at least one of: a physical cell identifier, PCI, a carrier frequency of an RF channel, a radio access technology, RAT, a band corresponding to the RAT, and a frequency priority for enhanced coverage machine type communication, MTC.

Third Example of Another More Detailed Embodiment

A third example of another more detailed embodiment of the cell selection and reselection procedure exemplifies how the stored information is obtained by the mobile station such that it can be used for determining whether or not, at a later point in time, to perform, utilizing the enhanced coverage mode, the detecting of candidate cells, and the subsequent selection or reselection of a cell from among the detected candidate cells.

Further to this example, the mobile station is assumed to have successfully detected synchronization signals for a scanned and identified RF channel for a cell. However, it is not necessary for the mobile station to have successfully received system information of the cell. The synchronization signals detected by the cell already enable the mobile station to identify the cell and to synchronize with downlink transmissions by the cell.

In this context, the mobile station identifies whether or not this cell supports the detecting step and the selecting step to utilize the enhanced coverage mode, by receiving and combining a predefined number of downlink transmissions on the cell. Moreover, the mobile station infers whether or not the cell supports the enhanced coverage mode from whether or not the cell uses the enhanced coverage mode for downlink transmission by the cell.

Specifically, the mobile station receives and combines a predefined number of transmissions on the cell, and, in response thereto, determines and stores information indicating whether or not the cells supports the detecting step and the selecting or reselecting step to utilize the enhanced coverage mode on the basis of whether or not the received and combined transmissions correspond to a same transport block.

According to an exemplary implementation of this example, the predefined number of transmissions on the cell, corresponding to same transport block, are physical downlink control channel, PDCCH, transmissions in system frame numbers, SFNs, 0, 8 16, and 24, and/or to physical downlink shared channel, PDSCH, transmissions in SFNs 32, 40, 48, and 56. The SFNs of this exemplary implementation shall, however, only be understood as an example and not be construed as limiting the determination performed by the mobile station.

The mobile station uses this newly stored information for determining whether or not, at a subsequent point in time, to perform, utilizing the enhanced coverage mode, the detecting operation of candidate cells and the subsequent selection or reselection operation of a cell from among the detected candidate cells.

Figure 13:
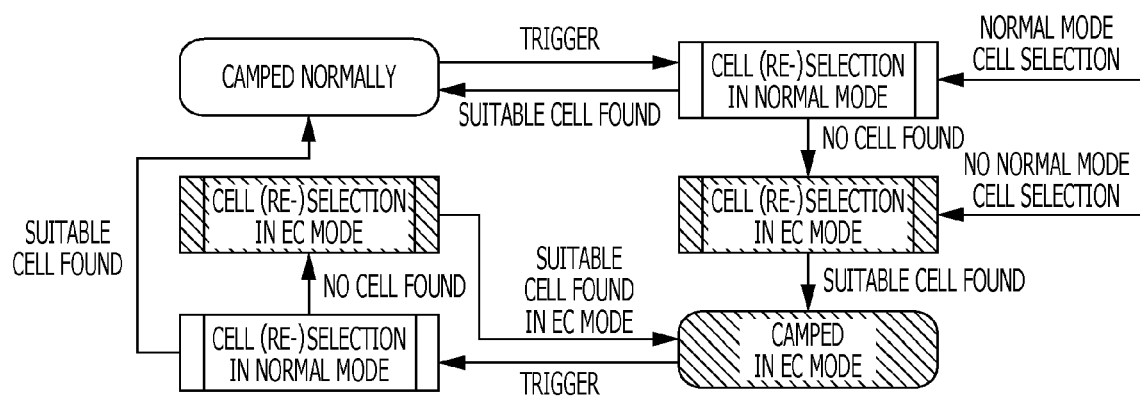
FIG. 13 illustrates a state machine for the cell selection and reselection procedure according to another more detailed embodiment.

Another more detailed embodiment of the selection and reselection procedure is shown in FIG. 13. This more detailed embodiment exemplifies the state transitions between a state where the mobile station is camped on (or accesses) a selected cell in the normal coverage mode and a state where the mobile station is camped on (or accesses) a selected cell in the enhanced coverage mode. In this context, it shall be emphasized that either one of the states where the mobile is camped on (or accesses) a cell results from the selection and reselection procedure of this disclosure. In other words, the selection or reselection of a cell results, in case of a successful selection or reselection operation, in the mobile station camping on (or accessing) the same cell.

Normally, the mobile station is configured to start performing the cell selection and reselection procedure utilizing the normal coverage mode (short: normal mode). Accordingly, the mobile station, as described with the various above embodiments, first performs, utilizing the normal coverage mode, the operation of detecting candidate cells and, subsequently, the operation of selecting or reselecting a cell from the detected candidate cells.

Having successfully detected at least one candidate cell and, having successfully selected or reselected a "suitable" cell from among the detected candidate cells, the mobile station is termed to camp on (or access) the "suitable" cell in the normal coverage mode. Moreover, in the context of the disclosure, a cell shall be considered "suitable" when the selection or reselection operation to this cell is successful.

Having unsuccessfully detected any candidate cells or having unsuccessfully selected or reselected any cell from among previously (i.e. successfully) detected candidate cells in the normal coverage mode, the mobile station has not found any "suitable" cell to camp on (or access) in the normal coverage mode (short: "no cell found"). In this situation, the mobile station uses stored information for determining whether or not to perform, utilizing the enhanced coverage mode, the cell selection and reselection procedure.

Specifically, if the stored information indicates that at least one of the candidate cells supports that the detecting operation and the selecting or reselecting operation to utilize the enhanced coverage mode, the mobile station is configured to perform cell selection and reselection procedure utilizing the enhanced coverage mode (short: EC mode). Moreover, if the stored information indicates that not a single one of the candidate cells supports the detection operation and the selecting or reselecting operation to utilize the enhanced coverage mode, the mobile station is configured to immediately proceed to the out of coverage state.

Accordingly, if the stored information indicates that at least one of the candidate cells supports the enhanced coverage mode, the mobile station, as described with the various above embodiments, first performs utilizing the enhanced coverage mode the operation of detecting candidate cells and, subsequently, the operation of selecting or reselecting a cell from the detected candidate cells.

Having successfully detected at least one candidate cell and, having successfully selected or reselected a "suitable" cell from among the detected candidate cells, the mobile station is termed to camp on (or access) the "suitable" cell in the enhanced coverage mode (short: camped in EC mode).

Having unsuccessfully detected any candidate cells or having unsuccessfully selected or reselected any cell from among previously (i.e. successfully) detected candidate cells in the normal coverage mode, the mobile station has not found any "suitable" cell to camp on (or access) in the normal coverage mode (short: "no cell found"). In this situation, the mobile station uses stored information for determining whether or not to perform, utilizing the enhanced coverage mode, the cell selection and reselection procedure.

Various conditions may trigger the mobile station to reinitiate the selection and reselection procedure when camped on a cell in the normal coverage mode or in the enhanced coverage mode. In either case the mobile station will proceed with the operations described, first, in the normal coverage mode and, second, in the enhanced coverage mode.

Exemplarily, conditions that trigger the selection or reselection procedure include moving out from connected mode e.g. as a result of (RRC) Connection Release procedure or an RLF (Radio Link Failure) but also improvements to reference signal receive power, RSRP, value, and/or with an unfavorable reference signal receive quality, RSRQ, value of the measured.

More importantly, the mobile station may also be configured to start performing the cell selection and reselection procedure utilizing the enhanced coverage mode (short: no normal mode cell selection). For this purpose, the stored information indicates, for example, only candidate cells which support the detecting operation and the selecting or reselecting operation to utilize the enhanced coverage mode.

In this respect, in case the stored information indicates, only candidate cells which support the detecting operation and the selecting or reselecting operation to utilize the enhanced coverage mode, the mobile station is configured neither to perform the detecting operation nor to perform the selecting or reselecting operation utilizing the normal coverage mode.

For example, depending on the application (or use case) of the mobile station, it can be reasonable to restrict the detecting operation and the selecting or reselecting operation to utilize the enhanced coverage mode, only. In this situation, the mobile station may be pre-configured with stored information indicating only candidate cells which support the enhanced coverage mode in a Subscriber Identity Module, SIM, or an Universal Subscriber Identity Module, USIM to be connected to the mobile station.

Figure 14:
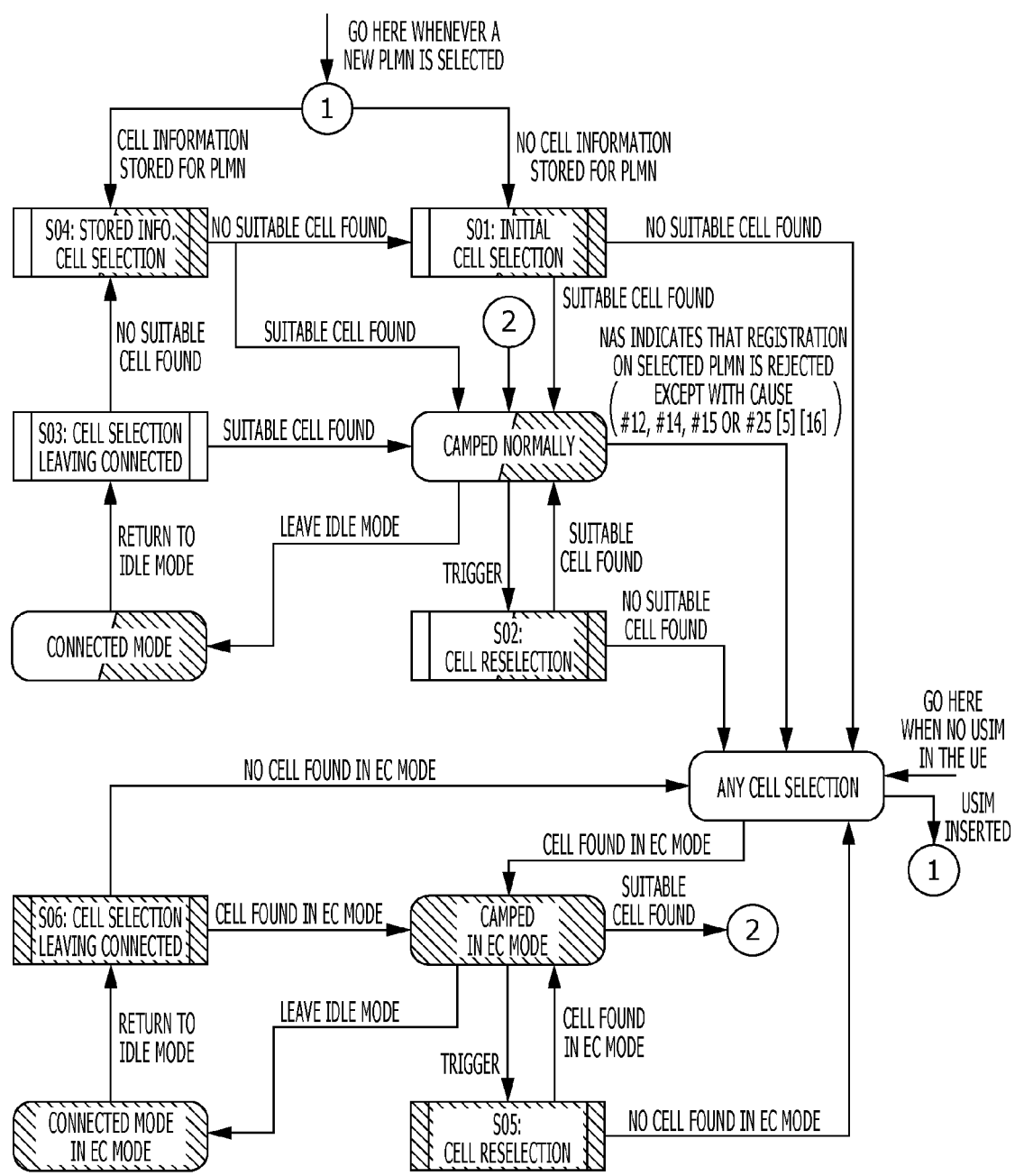
FIG. 14 details RRC_IDLE cell selection and reselection procedures according to another more detailed embodiment.

Another more detailed embodiment of the selection and reselection procedure is shown in FIG. 14. This more detailed embodiment shows the backward compatibility of the enhanced coverage mode with the conventionally known selection and reselection procedure in RRC Idle state. In this more detailed embodiment, the mobile station tries to camp on the normal coverage mode unless its "stored information" indicates that only enhanced coverage, EC, mode cell(s) is(are) available and the cell selection and reselection procedure in the normal coverage mode was unsuccessful.

As indicated in the figure, the cell selection or reselections procedures of the top half, i.e. the partially hatched boxes in the top half, (i.e. above box titled "Any Cell Selection"), indicate the possibility of the mobile station camping on a cell either utilizing the normal coverage mode or utilizing the enhanced coverage mode.

For example, the cell selection and reselection procedure titled "Stored info cell selection" cf. step S04) may indicate that all candidate cells only support the enhanced coverage mode or may indicate that candidate cells also include at least one cell supporting the normal coverage mode. In the latter case, the mobile station first performs the cell selection and reselection procedure in order to try to camp on the cell supporting the normal coverage mode.

Similarly, the cell selection and reselection procedure titled "initial cell selection" (cf. step S01) may result in the mobile station camping on a cell supporting the normal coverage mode, if such a cell is successfully selected in the cell selection and reselection procedure utilizing the normal coverage mode, or may result in the mobile station camping on a cell supporting the enhanced coverage, EC, mode when no cell is successfully selected in the cell selection and reselection procedure utilizing the normal coverage mode.

The lower half of the figure indicates camping from "Any Cell Selection" state when even the Acceptable cell (not shown in the FIG. 14) is not available. Interestingly, the mobile station could reach the Any Cell Selection state when either:

The cell selection criteria are fulfilled, as defined in the BACKGROUND section, but the said cell is not a suitable cell for example since it does not belong to any of the selected public land mobile network, PLMN, registered PLMN or Equivalent PLMN list; or, The cell detection itself is not possible since any possible available cell is way outside the normal coverage and/or suffers severe attenuation.

In this sense the enhanced coverage, EC, mode part of the FIG. 14 (lower half) is not replacing the Acceptable Cell camping state(s) but rather runs parallel to it when neither the cell in normal coverage mode nor an Acceptable cell can be found.

Moreover, in connection with this embodiment, it becomes clear that the cell selection and reselection procedures of steps S01, S02 and S04 equally utilize either the normal coverage mode or the enhanced coverage mode, and that in case of a successful selection or reselection of a "suitable" cell, the mobile station camps on same "suitable" cell using the respective one of the normal coverage mode or enhanced coverage mode.

Further, in this embodiment, the enhanced coverage mode is to be only utilized for the cell selection and reselection procedures S05, and S06 connected to the "any cell selection" state. In the "any cell selection state", the mobile station attempts to find an acceptable cell of any PLMN to camp on, trying all RATs that are supported by the UE and searching first for a high quality cell utilizing the enhanced coverage mode.

In other words, the mobile station tries to find a cell to camp on utilizing the enhanced coverage mode when it cannot find a "suitable" or "acceptable" cell. In present context, an "acceptable" cell is a cell that has good radio signal quality but has an authorization problem (e.g. not part of my PLMN list). More specifically, the Acceptable cell is defined in Ch. 4.3 of 3GPP TS 36.304. As a particular example, an Acceptable cell meets the cell selection or reselection requirements but is not part of any of:

the selected PLMN, or:
the registered PLMN, or:
a PLMN of the Equivalent PLMN list.

However, even for the Acceptable cell the cell selection criteria as discussed in the BACKGROUND section are fulfilled. Accordingly, a mobile station in extended coverage will not even detect/camp on a cell in "acceptable" form; so it has to try enhanced coverage mode coverage.

Another embodiment relates to the implementation of the above described various embodiments using hardware and software, or hardware only. In this connection the present disclosure provides an user equipment (mobile station) and a master and secondary eNodeB (base station). The user equipment and the base station are adapted to perform the methods described herein.

It is further recognized that the various embodiments of the present disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. In addition, radio transmitter and radio receiver and other necessary hardware may be provided in the apparatuses (UE, MeNB, SeNB). The various embodiments of the present disclosure may also be performed or embodied by a combination of these devices.

Further, the various embodiments of the present disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the present disclosure may individually or in arbitrary combination be subject matter to another present disclosure.

It would be appreciated by a person skilled in the art that numerous variations and/or modifications may be made to the present disclosure as shown in the specific embodiments without departing from the spirit or scope of the present disclosure as broadly described. The present embodiments are, therefore, to be considered in all respects to be illustrative and not restrictive.

What is claimed is:

1. A base station that supports a normal coverage mode and an enhanced coverage mode, comprising:

circuitry which, in operation, generates a message that includes a cell selection criterion; and a transmitter which, in operation, transmits, to a user equipment, a signal to perform measurements for cell selection or reselection, and the generated message, wherein the user equipment:

transmits a request for information on a plurality of cells previously selected or reselected successfully in at least one of the normal coverage mode or the enhanced coverage mode, and on cell parameters related to the cell selection criterion from previously received measurement control information elements or from previously detected cells, the information indicating whether or not at least one of the plurality of cells supports the enhanced coverage mode;

receives and stores the information;

detects candidate cells from the plurality of cells, and selects or reselects a cell among the detected candidate cells on the basis of the information, the user equipment utilizes the cell selection criterion with at least one of a first minimum required RX value Qrxlevmin or a first minimum required quality level Qqualmin, in case the cell selection criterion is utilized in the normal coverage mode, and the user equipment utilizes the cell selection criterion with at least one of a second minimum required RX value Qrxlevmin that is separately defined from the first minimum required RX value Qrxlevmin or a second minimum required quality level Qqualmin that is separately defined from the first minimum required quality level Qqualmin, which are specific for the enhanced coverage mode, in case (1) the cell selection criterion which is utilized in the normal coverage mode is not fulfilled for a selected or reselected cell by the user equipment and (2) the information indicates at least one of the detected candidate cells supports the enhanced coverage mode.

2. The base station according to claim 1, wherein the second minimum required RX value Qrxlevmin is lower than the first minimum required RX value Qrxlevmin, and the second minimum required quality level Qqualmin is lower than the first minimum required quality level Qqualmin.

3. The base station according to claim 1, wherein, in case of utilizing the enhanced coverage mode, the selection or reselection of the cell among the detected candidate cells includes ranking each of the candidate cells on a basis of a measured cell RX level value or a measured cell quality value.

4. The base station according to claim 1, wherein the information includes at least one of: a physical cell identifier (PCI), a carrier frequency of a radio frequency (RF) channel, a radio access technology (RAT), a band corresponding to the RAT, or a frequency priority.

5. The base station according to claim 1, wherein the generated message is broadcasted by system information block information.

6. The base station according to claim 1, wherein the user equipment transmits the request to a cell accessed by the user equipment.

7. The base station according to claim 6, wherein the information includes information for neighboring cells of the cell accessed by the user equipment.

8. The base station according to claim 1, wherein the request indicates previously detected cells, and the information includes information for the previously detected cells.

9. A method implemented in a base station that supports a normal coverage mode and an enhanced coverage mode, the method comprising:

generating a message that includes a cell selection criterion;

transmitting, to a user equipment, a signal to perform measurements for cell selection or reselection; and transmitting, to the user equipment, the generated message, wherein the user equipment:
- transmits a request for information on a plurality of cells previously selected or reselected successfully in at least one of the normal coverage mode or the enhanced coverage mode, and on cell parameters related to the cell selection criterion from previously received measurement control information elements or from previously detected cells, the information indicating whether or not at least one of the plurality of cells supports the enhanced coverage mode;
- receives and stores the information;
- detects candidate cells from the plurality of cells, and selects or reselects a cell among the detected candidate cells on the basis of the information, the user equipment utilizes the cell selection criterion with at least one of a first minimum required RX value Qrxlevmin or a first minimum required quality level Qqualmin, in case the cell selection criterion is utilized in the normal coverage mode, and the user equipment utilizes the cell selection criterion with at least one of a second minimum required RX value Qrxlevmin that is separately defined from the first minimum required RX value Qrxlevmin or a second minimum required quality level Qqualmin that is separately defined from the first minimum required quality level Qqualmin, which are specific for the enhanced coverage mode, in case (1) the cell selection criterion which is utilized in the normal coverage mode is not fulfilled for selected or reselected cell by the user equipment and (2) the information indicates at least one of the detected candidate cells supports the enhanced coverage mode.

* * * * *